United States Patent [19]
Nishina et al.

[11] Patent Number: 5,854,895
[45] Date of Patent: Dec. 29, 1998

[54] NETWORK DISTRIBUTION INFORMATION MANAGEMENT SYSTEM

[75] Inventors: Toshihide Nishina; Haruo Makimoto; Yasuhiro Okazaki; Hidehiko Kanayama, all of Kobe, Japan

[73] Assignee: Fujitsu Limited, Kawasaki, Japan

[21] Appl. No.: 418,678

[22] Filed: Apr. 7, 1995

[30] Foreign Application Priority Data

Jul. 6, 1994 [JP] Japan ..................................... 6-154436

[51] Int. Cl.⁶ .................................................. G06F 15/177
[52] U.S. Cl. .................. 395/200.51; 395/200.54
[58] Field of Search ......................... 395/200.01, 200.18, 395/200.03, 200.07, 600, 200.3, 200.31, 200.42, 200.76, 200.51, 200.53; 707/1, 8, 201

[56] References Cited

U.S. PATENT DOCUMENTS

| | | | |
|---|---|---|---|
| 4,432,057 | 2/1984 | Daniell et al. | 707/201 |
| 4,972,367 | 11/1990 | Burke | 707/10 |
| 5,155,847 | 10/1992 | Kirouac et al. | 395/200.51 |
| 5,327,560 | 7/1994 | Hirata et al. | 395/200.51 |

FOREIGN PATENT DOCUMENTS

| | | |
|---|---|---|
| 2-73731 | 3/1990 | Japan . |
| 2-231669 | 9/1990 | Japan . |
| 3-33967 | 2/1991 | Japan . |
| 3-158961 | 7/1991 | Japan . |
| 4-38548 | 2/1992 | Japan . |
| 4-247796 | 9/1992 | Japan . |
| 2 273 182 | 6/1994 | United Kingdom . |
| 93/20524 | 10/1993 | WIPO . |

OTHER PUBLICATIONS

Chundi et al., Deferred updates and Data Placement in Distributed Databases, 1996, IEEE, 469–476.

*Primary Examiner*—Parshotam S. Lall
*Assistant Examiner*—Patrice L. Winder
*Attorney, Agent, or Firm*—Staas & Halsey

[57] ABSTRACT

A communication system which includes a plurality of information processing units connected to a network. Each information processing unit includes a database for storing information. A duplicate of the information is distributed to each of the other information processing units. Moreover, each information processing unit modifies the information in its database, extracts a differential of the information before modification and the information after modification, and transfers the differential to each of the other information processing units.

32 Claims, 27 Drawing Sheets

FIG. 5

| PARTNER COMPUTER SYSTEM | EDITION NUMBER OF TRANSMITTED INFORMATION | EDITION NUMBER OF RECEIVED INFORMATION |
|---|---|---|
| SYSTEM B | 3 | |
| SYSTEM C | 5 | |
| SYSTEM D | 7 | |

FIG. 7

| RESOURCE NAME | LOCATION OF INFORMATION STORAGE IN TARGET DATABASE | EDITION NUMBER OF MODIFICATION PROCEDURE | MODIFIED SEGMENT |
|---|---|---|---|
| a | | 1 | ADD |
| b | | 2 | CHG |
| c | | 3 | DEL |
| d | | 5 | ADD |
| e | | 4 | CHG |
| f | | 8 | ADD |
| g | | 6 | ADD |
| h | | 7 | ADD |
| i | | 5 | CHG |
| j | | 8 | ADD |
| k | | 9 | CHG |
| | | | CHG |

FOR PARTNER SYSTEM C, THE AN UPDATING OF THE RETRIEVAL ENVIRONMENT IS INDICATED WHEN PROVISION UP TO A PROCEDURE EDITION NUMBER OF 9 HAS BEEN SUCCESSFUL. (●●●INDICATES A PART THAT IS DELETED, AND ----- INDICATES A PART THAT IS ESTABLISHED)

FIG. 26

| NAME | CONDITION | SYSTEM OF ORIGIN | MUTUAL RELATIONSHIP | ERROR INFORMATION |
|---|---|---|---|---|
| APPLICATION PROGRAM 1 | DEFINITE RECORD | HOST SYSTEM | | |
| APPLICATION PROGRAM 2 | TEMPORARY EXPANSION | SYSTEM B | SYSTEM B | |
| APPLICATION PROGRAM 3 | TEMPORARY MODIFICATION | SYSTEM B | SYSTEM B | |
| SYSTEM B | DEFINITE RECORD | SYSTEM B | SYSTEM B | |
| TERMINAL 1 | DEFINITE RECORD | HOST SYSTEM | | |
| TERMINAL 2 | TEMPORARY DELETION | SYSTEM B | SYSTEM B | |

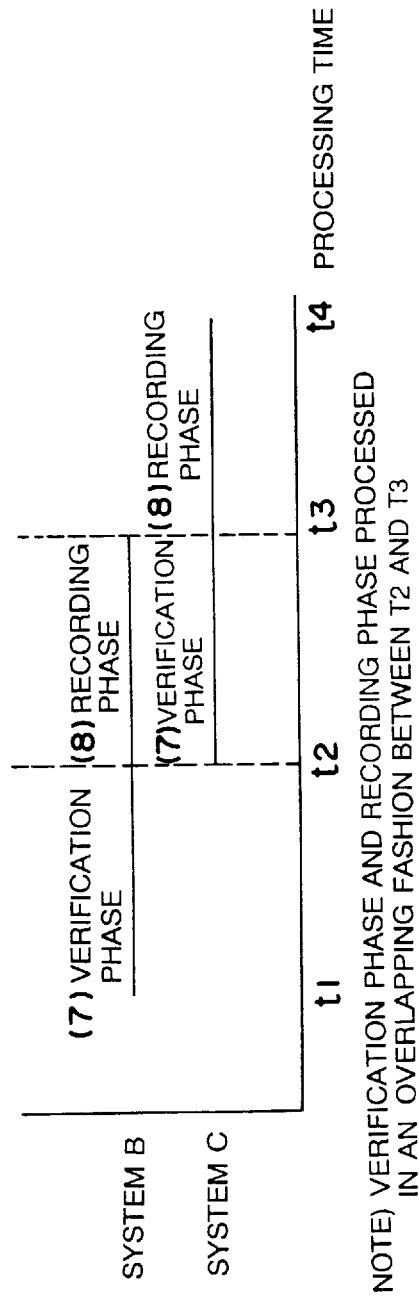

NETWORK DISTRIBUTION INFORMATION MANAGEMENT SYSTEM

BACKGROUND OF THE INVENTION

1. Field of the Invention

The present invention relates to a system that provides a plurality of information processing units to a network in order to share information. The present invention relates in particular to the information management of an information processing unit which is connected to a network, which has a database of stored information, which distributes duplicates of said information to other information processing units that are connected to said network, and which, when there is a change in this information, relays this change to the other information processing units. An example of the information that may be distributed to the various information processing units is network definition information necessary for the shared utilization of a communications resource via a network.

2. Description of the Related Art

In a network in which a plurality of computer systems are connected as information processing units, duplicates must be stored in some other computer system in order to improve the information access response and reduce the effect of errors in the computer system managing the information. This duplicate information must be occasionally sent to another computer system when there are changes in the information in the computer system that is actually managing the information so that the information does not become outdated. In addition, these computer systems are not necessarily constantly operated, so a change in the information in one computer system is not immediately relayed to another computer system. The part that is not relayed, therefore, must be relayed at some other time, and information that has been changed at different times must be relayed to each of the various computer systems.

Examples of methods that may be considered for dealing with this situation include (1) distributing all the information to a partner computer system that holds a duplicate, (2) reconstructing the database so that it can also collate the times at which the managed information has been modified so that the modified information can be extracted, and (3) storing the modified information separately.

First Object

With the method of (1) above, however, since all the information is distributed, the volume of data communication is considerable. With the method of (2), systems and programs that utilize databases formed prior to reconstruction are affected. With the method of (3), there must be space in the memory for separately storing the modified information.

In the case of a method for relaying the modified information, moreover, it is necessary to manage the time at which the information is relayed in order to eliminate discrepancies in the communication cut-off point with the partner computer system.

With such a management system, however, it is necessary to synchronize the times of all the computer systems in the network, because when this is not done it is impossible to determine whether the information that has been modified from a given point in time is required or not.

With the foregoing in view, the first object of the present invention is the systematic and efficient management of the information that is to be relayed to each of the partner systems in the network.

Second Object

With network systems having scattered resources, such as databases and a plurality of information processing units, an individual information processing unit accesses, for example, a database or another information processing unit, and this allows for the efficient utilization of information and for processing at higher speeds, among other things. To realize such advantages, each information processing unit must, instead of simply managing its own allocated information resource, also manage the information resources allocated to the other information processing units. For this reason, when the information processing units on a network access network definition information for accessing an information resource, such as the information resource of a terminal, through the network, the defined object becomes the terminal, although in this case the host LAN controller, the LAN transmission line, the partner LAN controller, the terminal controller, and the target terminal equipment are all incorporated as definition information. Such definition information is absolutely necessary when communicating with another communications resource through the network.

When a given system is constructed on a network, definition for a given resource under the control of this system is accomplished within the system, and this definition information is distributed to partner system. These definitions are determined by the operator in charge of the system.

The second object of the present invention is to readily execute the system resource definitions required for the shared or mutual use of the resource among the systems on the network.

Third Object

Each partner system has definition information indicating the communication resources (programs, terminal) controlled by the own system, as well as definition information indicating the communication resources (programs, terminals) controlled by the partner system; two methods for utilizing definition information indicating the communication resources under the control of a communication system in a network system for mutual communication by means of this definition information are described below.

(1) Definition information is prepared for each system.

(2) Each own system sends the definition information indicating the communication resources under the corresponding system control to the systems that are its communication partners.

When the method of (2) above is adopted, the following two things are considered essential to definition information indicating a communications resource.

Definition information indicating a communication resource is in general not a single entity, but is instead a collection in which each unit group extending from the system to the target communication resource is defined independently; a logically ordered relationship exists for the definition information of each unit. For example, as described above, when the defined object is a terminal, the host LAN control unit, the LAN transmission line, the partner LAN control unit, the terminal controller, and the target terminal equipment are all incorporated as definition information. Thus, when these pieces of definition information are employed by a system, either they must all be employed simultaneously, or they must be employed from the definition information of a unit close to the system. For example, when the definition information of a LAN control unit that reaches the target terminal equipment is not applied, communication with this terminal equipment is impossible even if the definition information of this terminal equipment is applied. In such cases, the application processing itself fails, and the user is given a warning. Errors in the order of application of the definition information consequently result in definition errors.

Another noteworthy point is the single definition information application amount. When definition information is used by an individual system, as in the method of (1), the definition information can be used to restart the system, and there is consequently no limit to the quantity of definition information that can be applied at one time. However, in the case of the method of (2), since the receiving system is ordinarily unmanned, it is necessary to use the definition information without restarting the system during operation. In short, "active use" is required. Since the use of the definition information is ordinarily such that the operational environment of the system is changed, there are limits to the amount of definition information that may be applied at one time. For this reason, when a large amount of definition information is applied, it must be partitioned for application.

The order of use that accompanies this definition information ordered relationship and the partitioned application that accompanies the single application amount entail the following problems in conventional technology.

The following relates to a reordering of the definition information.

Firstly, when the problem is dealt with by the receiving system, once all of the definition information has been received, it is reordered in accordance with the ordered relationship; a sorting mechanism is thus necessary, and the sorting time tends to prolong the processing time. Once all of the definition information has been received, moreover, special memory for temporarily storing the definition information, and a storage device, are necessary.

Dealing with the problem at the side of the transmitting system is similar. With the transmitting system, once all of the transmitted definition information has been read and reordered, it is partitioned and transmitted. In this case, therefore, a sorting mechanism, memory for temporarily storing the definition information that has been read, and a storage device, are required by the transmitting system.

If all of the definition information is applied at one time by restarting the system without reordering the definition information, the mechanism and medium required for reordering are not needed, but a mechanism for restarting the receiving system by remote control from the transmitting system is required.

With the foregoing in view, the third object of the present invention is to offer a system that makes it possible to inexpensively apply definition information without requiring, for example, a sorting mechanism or memory for temporarily storing definition information.

Fourth Object

When definition information is distributed to the system that serves as the communication partner in a network connecting a plurality of computer systems, moreover, the following problems arise.

Definition information cannot be used simply by having been distributed to the partner system. The operator must execute a relay operation in order to put the partner system in a state in which the distributed definition information is activated and communication is enabled (hereafter referred to simply as "relay").

The relay prompt information is thus sent to the partner material along with the modified definition information, and this eliminates the need for an operator so long as the definition information is relayed automatically following collective definition by the partner system.

Specifically, there are cases in which the essentials of relay differ among the plurality of partner systems. When a business on-line system and an intraoffice OA system are present simultaneously as partner systems, the serviceability of the business on-line system is degraded by the change in the load balance, or its safety is degraded by the definition information, and definition relay is undesirable; however, immediate relay to the intraoffice OA system is desirable, and problems arise when the essentials of relay differ for each system.

With the foregoing in view, the fourth object of the present invention is to enable relay for each independent system when definition information is distributed for relay to a plurality of systems.

Fifth Object

Finally, the following problems also arise in said definition information relay. Specifically, when a plurality of systems are placed on a network and definition information is shared among them and relayed, a definition information processing system for taking the definition information from the partner system and recording it integrates definition information verification (name duplication, other definition conformability verification, and the like) processing and recording processing, verifies the definition information on the basis of the definition information recorded in the database and the definition information that is to be recorded, and implements recording; the following two problems result.

(1) For example, when definition information is simultaneously recorded from a plurality of communication partner systems B and C, there are both methods for recording the system B and C definition information separately, and methods for recording them collectively.

With methods for recording definition information separately, in order to ensure the conformability of the definition information over the entire network, the definition information of one of the systems (e.g., system B) is recorded, after which the definition information of partner system (e.g., system C) is recorded. Since this is serial processing, time is required until the definition information of system C is recorded, and it is thus necessary to have memory or the like for storing the definition information received until processing has been completed. The communication time limit set by the communication time monitor function is thus exceeded, resulting in definition information recording failure; this also affects processing in which there are insufficient resources, such as memory which requires a subsystem or the like.

With methods for the collective recording of the definition information of a plurality of systems, when there is an error in the definition information of a given system, since it is not clear which system contains the definition information error, the recording of the definition information of the systems that are error-free also fails.

(2) When the definition processing of own system definition information and the definition processing of partner system definition information are in conflict, similar problems arise as in the method of (1) in which the definition information is recorded separately.

The fifth object of the present invention is to shorten the time required for the verification and recording of the definition information of a plurality of systems when definition information that has been taken from a plurality of systems is recorded separately.

SUMMARY OF THE INVENTION

The present invention is intended to realize at least one of the five objects described above.

The present invention relates to a system for managing information processing units that are connected to a network and that have databases for storing information. Said information processing units distribute duplicate information to the other information processing units that are connected to the network, so that if there is a change in that information, this change will be relayed to the other information processing units. As an example of distributed information, it is possible to give the definition information that is necessary to access a resource on the network through remote communication.

Means Used to Achieve the First and Second Objects

The present invention employs the following means to achieve the first and second objects described above.

This system is furnished with a modification processing means for modifying the information of the database, a differential extraction means for extracting the difference between the information prior to said modification and the information subsequent to said modification, and a duplicate transfer processing means for transferring the modified information extracted by this differential extraction means to the other information processing units.

Thus, when the information is modified by the modification processing means, the difference between the information prior to said modification and the information subsequent to said modification is extracted as modified information by the differential extraction means, and this extracted modified information is transferred to the other information processing units by the duplicate transfer processing means.

This system can also be furnished with a modification content management means for storing the contents of the modification, e.g., the expansion, alteration, or deletion of information, during information modification. The differential extraction means is thus a modification content management means that extracts as the difference the part that has been changed, e.g., expanded, altered, or deleted, between the old and new information at the time of differential extraction. The differential information that has been extracted is transferred to the other information processing units by the duplicate transfer processing means.

Specifically, the differential extraction means enables the extraction of the differential through a comparison of the information prior to modification and the information subsequent to modification; only the part that has been modified during modification by the modification processing means (the differential) is stored separately, and it is this modified part that is extracted.

This system can also be furnished with an identification symbol provision means for providing information identification symbols for indicating which information is old and which is new during the modification of the information.

An edition number, i.e., version number, is one possible example of such an information identification symbol. For example, if the initial information is termed version 1, then the subsequently modified information will be version 2, version 3, and so on. This version numbering system allows the old and new information to be distinguished without using time information. As long as the old and new information can be discerned, any format may be used for the information identification symbols. The difference between the old and new information can thus be extracted using the old and new information identification symbols.

The differential extraction means has a destination information management means for managing the old and new identification symbols of the transferred information for the partner information processing units on the network. Following information modification, the differential extraction means compares the old information identification symbols that indicate the duplicate information of the partner information processing unit and that are managed by the destination information management means with the new information identification symbols that indicate the information that has been modified, and extracts the differential between the information corresponding to the old information identification symbols and the information corresponding to the latest new information identification symbols.

When this system has a modification content processing means and an identification symbol provision means, the modification content processing means is referenced in the extraction of the differential between the information corresponding to the old information identification symbols and the information corresponding to the latest new information identification symbols, and the part that has been modified, e.g., expanded, altered, or deleted, from the old to the new information is extracted as the differential.

The differential extraction means also enables differential extraction to be accomplished with resource information entries or distribution resource lists. Resource information entries have locations for storing information in the database, information identification symbols, and names for this information. A distribution resource list is provided for each identification symbol of information transferred by the destination information management means, and this list controls one or a plurality of resource information entries; when a resource information entry having a newer symbol that this information identification symbol is present, a distribution resource list is prepared for the identification symbol of the latest modified information among these resource information entries. The differential extraction means thus indexes, from the distribution resource list corresponding to the information identification symbol of the differential information to be transferred, the resource information entry under the control thereof, and extracts the modified information managed by this resource information entry.

The differential extraction means can also employ a resource information set. This resource information set is assembled from one or a plurality of resource information entries in such a way that the transferred edition number of the distribution resource list is not exceeded. The differential extraction means retrieves the modified information for a resource information entry from the distribution resource list via the resource information set.

Although a resource information set is not absolutely necessary, since the resource itself must be incorporated and saved in the next information identification symbol (edition number) when a superfluous distribution resource list is deleted or individual processing interfaces are unified, a resource information set is used to facilitate these procedures from a programming standpoint.

When differential extraction is performed, the modification content management means is referenced, and the part that has been modified, e.g., expanded, altered, or deleted, from the old to the new information is extracted as the differential. In the extraction of the differential, as described above, extraction is facilitated by the creation of an information retrieval system, i.e., resource information entries, distribution resource lists, and also resource information sets. The differential extraction means retrieves the resource information entry from the distribution resource list that controls it and that corresponds to the information identification symbol of the differential information that is to be transferred, and extracts the modified information managed by this resource information entry. At this point, the resource information of the new identification symbol is transferred by means of the information identification symbol of the information that has been transferred to the partner system. Specifically, when there is a distribution resource list that has been created after the distribution resource list that corresponds to the information identification symbol of the information that has been transferred to the partner system, the related resource information is transferred from this distribution resource list. The differential extraction means thus retrieves the modified information for the resource information entry from the distribution resource list via the resource information set.

The distribution resource list of the differential extraction means orders the old and new information identification symbols in a queue and thereby enables retrieval in the order of the queue. The advantage is that when the old and new information identification symbols are ordered in a queue by the distribution resource list, the old and new identification symbols can be replaced in the order of the queue.

It is also possible to provide a differential extraction environment expansion processing means that, when the information is modified, not only creates a transitional identification symbol for the new information and incorporates this into the resource information set as a resource information entry, but also creates a new resource information set and creates a distribution resource list.

It is also possible to provide a differential extraction environment construction means for constructing the differential extraction means for the sake of differential extraction. The resource information entry, resource information set, distribution resource list, and the like are created taking into account cases in which the differential extraction means has not been in place from the beginning.

As a result of transferring the differential information to all of the partner information processing units on the network (NW), it is also possible to provide a differential extraction environment update processing means for removing from the differential extraction means the extraction environment of the differential of the modified information corresponding to the information identification symbol that will become superfluous. The differential extraction environment update processing means may be established so that the distribution resource list for the modified information corresponding to the information identification symbol that will become superfluous is deleted from the differential extraction means as a result of the transmission of the differential information to all of the partner information processing units on the network. A differential extraction environment expansion processing means, a differential extraction environment construction means, and a differential extraction environment update processing means create, add, and delete resource information entries, resource information sets, distribution resource lists, and the like to constantly update the differential extraction means.

It is also possible to provide an operations control means for prompting the replacement of the differential between the old and new information for at least one of the partner information processing units when the information processing unit is started or when information is modified. The operations control means may be established so that the replacement of the transitional information differential, when requested by a partner information processing unit, is prompted for that partner information processing unit.

It is also possible to provide a duplicate relay processing means that relays the differential information received from the partner information processing unit to the database.

The present invention employs the following means as a way of achieving the third object.

Specifically, in the system described above, the information that is to be distributed is definition information that is necessary for communication over the network. Transmission to the partner unit is accomplished sequentially from the definition information of the unit close to the transmitting system in accordance with a positional relationship seen from the transmitting unit that defines the definition information to be transmitted.

A definition master for connecting and storing on the database the definition information, unit name (definition name), and classification of the unit that is the object of definition is constructed; ideally, therefore, the definition information is retrieved at each level when the classification has been divided by level according to a positional relationship as seen from the transmitting information processing unit, and is then sent to the partner unit from the definition information on a level close to the transmitting system.

Specifically, to achieve the third object, transmission is effected to the partner unit in order, as seen from the transmitting unit, from the definition information of the unit close to the transmitting unit. For this reason, the definition master that relates and stores the definition information, unit name (definition name), and classification of the unit that is the object of definition that have been provided to the database is referenced, and the definition information is retrieved, and transmitted, according to its location in the positional relationship.

The information processing unit can also be furnished with a partitioned transmission processing means for partitioning the definition information to be transmitted, and then transmitting it, by taking into account the volume of information that is to be received by the partner information processing unit.

The information processing unit may also be equipped with a partitioned application processing means for partitioning the definition information received and transmitting it.

In the transmission and reception of the definition information, therefore, the definition information that is to be transmitted is partitioned and transmitted taking into account the volume of information that is to be received by the partner information processing unit. The definition information received by the receiving unit is partitioned and applied to the unit.

The present invention is a distribution information processing system in which a plurality of information processing units are connected to a network, and which relays definition information to an information processing unit by distributing the definition information that is necessary for communication among the information processing units to the information processing units that are connected to the network, and may also be a distribution information management system characterized by the fact that the definition information that is transmitted is transmitted to the partner unit in order from the definition information in a position close to the transmitting unit according to the positional relationship as seen from the side of the defined transmitting unit.

When such a system is constructed, it can be constructed in such a way that a definition master for connecting and storing the definition information, unit name (definition name), and classification of the unit that is the object of definition is constructed, definition information is retrieved for each level when the classification is divided by level according to its location in a positional relationship as seen from the transmitting information processing unit, and transmission to the partner unit is then executed from the definition information on a level close to the transmitting system.

The information processing unit may also have a partitioned transmission processing means that partitions and transmits the definition information that is to be transmitted by taking into account the volume of information that is to be received by the partner information processing unit. The information processing unit can also have a partitioned application processing means for the partitioned application of the definition information received.

The present invention employs the following means to achieve the fourth object.

In the system of the present invention, which is equipped with a modification processing means for modifying the information in the database, a differential extraction means for extracting as modified information the differential between the information prior to modification and the information subsequent to modification, and a duplicate transfer processing means for transmitting the modified information extracted by this differential extraction means to the other information processing units, the information to be distributed may also be definition information necessary for communication over the network. When this definition information is distributed and relayed to the partner information processing unit, it is also possible to create a distribution information management system having an information coupling means that couples the modified definition information created by the modification processing means and the relay prompt information that prompts the relay of the modified information, and a duplicate transfer processing means for transmitting to the partner information processing units the coupled modified definition information and the relay prompt information.

It is also possible to relay to the receiving system the decision of the transmitting system by coupling the modified definition information prepared by the modification processing means and the relay prompt information that prompts the relay of the modified information.

Here, it is possible to provide a relay priority level decision means for deciding priority levels for the relay of the modified definition information to each of the partner information processing units, and to include the priority level decided by this relay priority level decision means in the relay prompt information, and couple this relay prompt information and modified definition information by the information coupling means and then transmit the resulting product.

On the receiving side, it is possible to furnish an information separation means for separating the coupled information received into the modified definition information and the relay prompt information, as well as a relay execution means for relaying the modified definition information according to the relay prompt information. Here, it is also possible to provide a relay necessity decision means for determining relay necessity when the relay priority level of the partner information processing unit is different; the relay priority level of the definition information is evaluated/determined by the transmitting information processing unit and the partner information processing unit, and either the relay priority level of the transmitting information processing unit or the relay priority level of the partner information processing unit is selected.

In a distribution information management system in which a plurality of information processing units is connected to a network and which distributes and relays definition information necessary for communication among the information processing units to the partner information processing units, it is also possible to create a distribution information management system that is furnished with a modification processing means for modifying definition information, an information coupling means for coupling the relay prompt information that prompts the relay of the modified information with the modified definition information prepared by the modification processing means, and a duplicate transfer processing means for transmitting to the partner information processing units the coupled modified definition information and relay prompt information.

Here, it is also possible to create a distribution information management system that is furnished with a relay priority level decision means for determining the relay priority level for the modified definition information for each partner information processing unit, and that includes the priority levels determined by this relay priority level determination means in the relay prompt information and couples this relay prompt information with the modified definition information by an information coupling means and then transmits the resulting product.

It is thus possible to provide an information separation means for separating the coupled information that has been received into modified definition information and relay prompt information, and a relay execution means for relaying the modified definition information according to the relay prompt information. When the relay priority level is different for the partner information processing unit, moreover, it is possible to provide a relay necessity decision means that determines relay necessity by evaluating/determining the relay priority levels of the definition information of the transmitting information processing unit and the partner information processing unit, and selecting either the relay priority level determined by the partner information processing unit or the relay priority level determined by the transmitting information processing unit.

Means for Achieving the Fifth Object

The present invention employs the following means to achieve the fifth object.

In a system that is furnished with a modification processing means for modifying database information, a differential extraction means for extracting as modified information the differential between the information prior to modification and the information subsequent to modification, and a duplicate transfer processing means for transmitting to the other information processing units the modified information extracted by this differential extraction means, it is also possible to provide a verification processing means for verifying the information transferred from the other information processing units and a recording processing means for recording the information deemed erroneous on the basis of this verification, and to thus sequentially execute the verification and recording of the information that has been received, and to verify information subsequently received as the information previously received is recorded. This is termed overlap processing.

Here, "information" is the definition information that is necessary for communication among the information processing units; a definition information management list that contains the name of this definition information, the state of recording of the definition information, and the name of related other definition information, is provided, making it possible to reference this management list during verification in order to conduct an error check.

The verification processing means thus receives the definition information and the operation classification and carries out a thorough check of the names of the definition information and also a related check, and the recording processing means writes the results of each check, the name of the definition information recorded from the operation classification of the definition information, the state of recording of the definition information, and the names of the related other definition information to the management list, thereby making it possible to record these to the database. A structure may also be established in which, when there is an error, an error message is immediately sent to the source of information transmission.

A structure may also be established whereby, when a plurality of system definition information is processed collectively and an error occurs, an error is found only for the definition information of the system in which the error occurred, and an error message is then sent to this system.

This ensures the conformability of the definition information for all the systems on the network.

The above structures can also, where possible, be combined.

The present invention has the following merits when information is distributed over a network to which a plurality of information processing units have been connected.

Since the modified information differential is extracted and transmitted, the amount of data communicated can be reduced. As a result, the amount of data communicated can be reduced compared to a method that distributes all of the information, and since the modification content management means separately manages whether certain information has been modified or not, it is possible to extract the modified information without affecting the conventional definition information database that is the object, or the program that utilizes it. Since the modified information itself is not stored separately, no space is needed for it.

The times at which distribution can be accomplished differ when, for example, a certain partner information processing unit has shut down and distribution has failed; since the modified information is extracted at different times for each of the partner computer systems, the interdependence of the information processing units is eliminated, and each of the information processing units on the network can be stopped and restarted independently.

As far as the clocks of the information processing units on the network not being synchronized at communication cut-off, since relay communication is not done based on the time, and the relay time is managed using transitional identification symbols for the modified information, it is possible to transmit and receive modified information without relying on the clocks of the partner information processing units, and this makes it possible to accomplish accurate information management.

Since the relay prompt information is transmitted from the transmitting system for relaying information to the partner information processing unit, it is possible to effect remote relay.

The ordered transmission of definition information starting from the definition information of the unit close to the transmitting system is not effected by utilizing a conventional sorting technology to reorder the definition information prior to transmission, but is, rather, realized through the utilization of values that express the positional relationship of the classification of definition information of each unit, and it is therefore possible to use a definition information transmission system that has no time loss and that is inexpensive.

It is possible to effect simultaneous distribution by means of the different definition information relay conditions for each of the plurality of partner information processing units, and this enables operation in a networked configuration that is ideal for each individual business.

When the definition information of each system is defined individually, moreover, it is possible to ensure conformability for recording over the entire network without a record of the definition information of a given system. It is consequently possible to shorten the time allotted to a given resource, such as memory, and also possible to alleviate communication errors caused by communication time monitoring, by shortening the processing time, and thereby possible to minimize the effect on processing.

A simplified diagram depicting the relationship of various embodiments of the present invention.

FIG. 2

A diagram depicting the basic structure of Embodiment 1.

FIG. 3

A diagram depicting a LARSC node set definition method.

FIG. 4

A structural diagram of an embodiment.

FIG. 5

A diagram depicting an address information management list.

FIG. 6

An explanatory diagram of a structure of a table for extracting modified information.

FIG. 7

An explanatory diagram of a modification content management list.

FIG. 8

An explanatory diagram of the procedure of a table for deleting a superfluous edition number.

FIG. 9

A flow chart depicting differential transfer processing during resource information modification.

FIG. 10

A flow chart depicting differential transfer processing during computer system start-up.

FIG. 11

A flow chart depicting the operation of the modification content recording processing means.

FIG. 12

A flow chart depicting the processing of the differential extraction environment construction processing means.

FIG. 13

A flow chart depicting the processing of the differential extraction environment expansion processing means.

FIG. 14

A flow chart depicting the processing of the differential extraction processing means.

FIG. 15

A flow chart depicting the processing of the differential extraction environment updating processing means.

FIG. 16

An overall diagram depicting the system of Embodiment 2.

FIG. 17

A diagram depicting the definition information transmission order.

FIG. 18

A flow chart depicting the processing of the transmitting system.

FIG. 19

A flow chart depicting the processing of the receiving system.

FIG. 20

A structural diagram of Embodiment 3.

FIG. 21

A flow chart depicting the processing of Embodiment 3.

FIG. 22

A structural diagram of Embodiment 4.

FIG. 23

A flow chart depicting the processing of Embodiment 4.

FIG. 24

A flow chart depicting the processing of the resource information management processor (phase 1).

FIG. 25

A flow chart depicting the processing of the resource information management processor (phase 2).

FIG. 26

An example of the management list of Embodiment 4.

FIG. 27

A time chart depicting the transitions of the definition processing in system A.

DESCRIPTION OF THE PREFERRED EMBODIMENTS

Embodiments of the present invention are described below with reference to the figures.

The Interrelationship of Embodiments 1 through 4

Each of Embodiments 1 through 4 relates to a network (NW) over which a plurality of information processing units has been distributed, and to the distribution of the network (NW) definition information required for the shared communication of common resources among the various information processing units.

Figure 1:
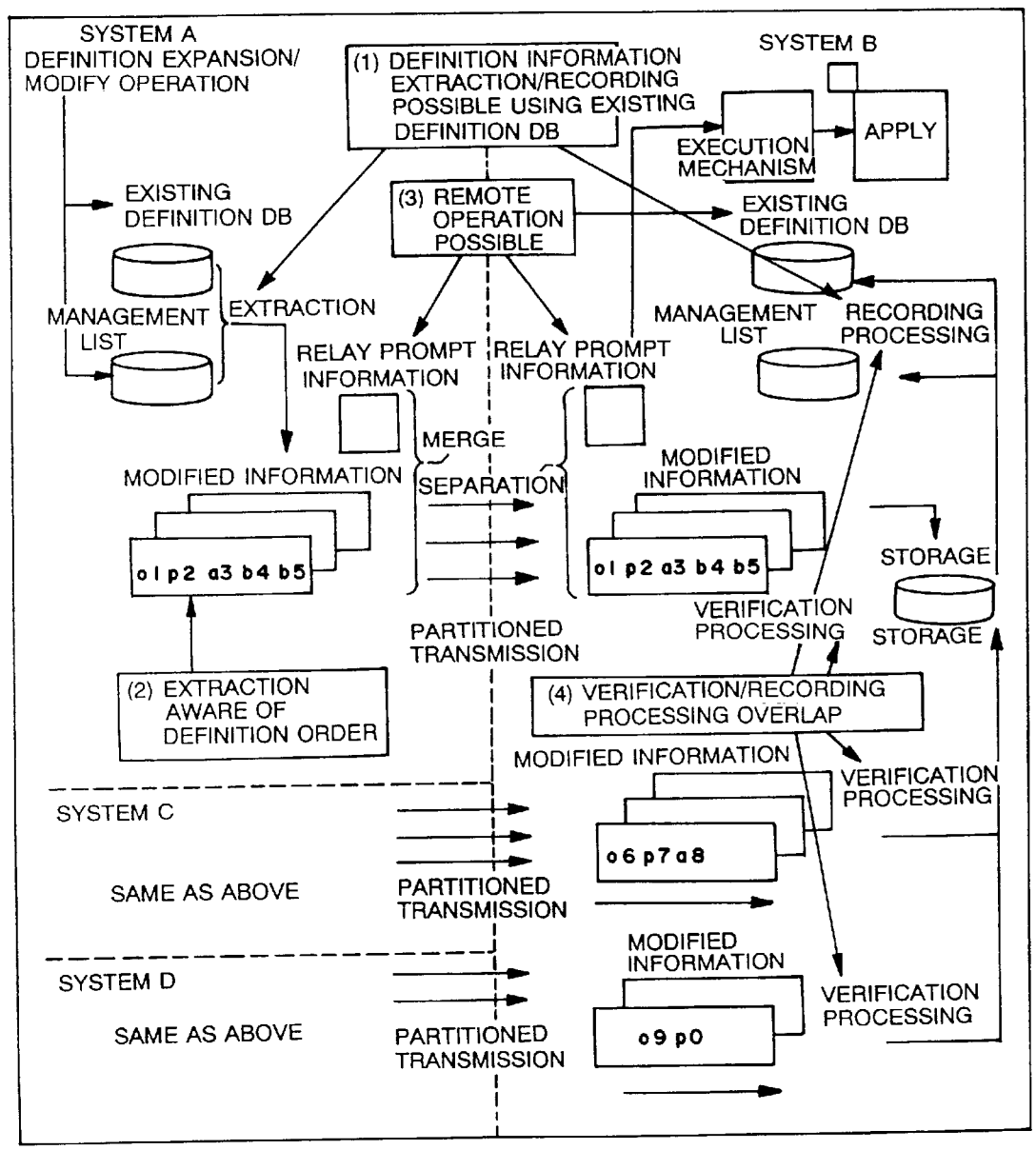
FIG. 1

In FIG. 1, information processing units are depicted by systems A through D, and there is a database 1 that stores definition information. The definition information of the database 1 is modified by a modification processor 2, the contents of the modification are managed by the management list, the differential between the information prior to modification and the information subsequent to modification is extracted by a differential extractor 4, and this modified information is transmitted to the other information processing units by means of a duplicate transfer processor 12. The modified information is recorded on the receiving side and relayed to the system. This is Embodiment 1 shown by the (1) in FIG. 1, and it achieves objects 1 and 2.

In the modification, extraction, and transmission of the definition information, transmission is effected to the partner units in order from the definition information of the unit close to the transmitting side, in accordance with the positional relationship as seen from the transmitting unit in which the definition information is defined. This is Embodiment 2, which relates to the extraction and transmission in the definition order shown by (2) in FIG. 1, and it achieves object 3.

In the transmission of the definition information, moreover, in order to remote operation the relay of the definition information at a partner system from the transmitting side, the relay prompt information that prompts the relay of the modified information and the modified information that is transmitted are coupled together and transmitted as one, and this data returns to its two sources at the receiving side and is relayed to the system. The relay priority level is also taken into consideration as relay prompt information. This is Embodiment 3 shown by (3) of FIG. 1. This achieves the fourth object.

Finally, in the relay of the definition information, the verification and recording of the various information received is effected in order, but at this time the verification of the information that is subsequently received is performed at the same time as the recording of the information that has been received previously. Specifically, verification and recording overlap. This is Embodiment 4 shown by (4) of FIG. 1. This achieves the fourth object.

Embodiment 1

Summary of Embodiment 1

Figure 2:
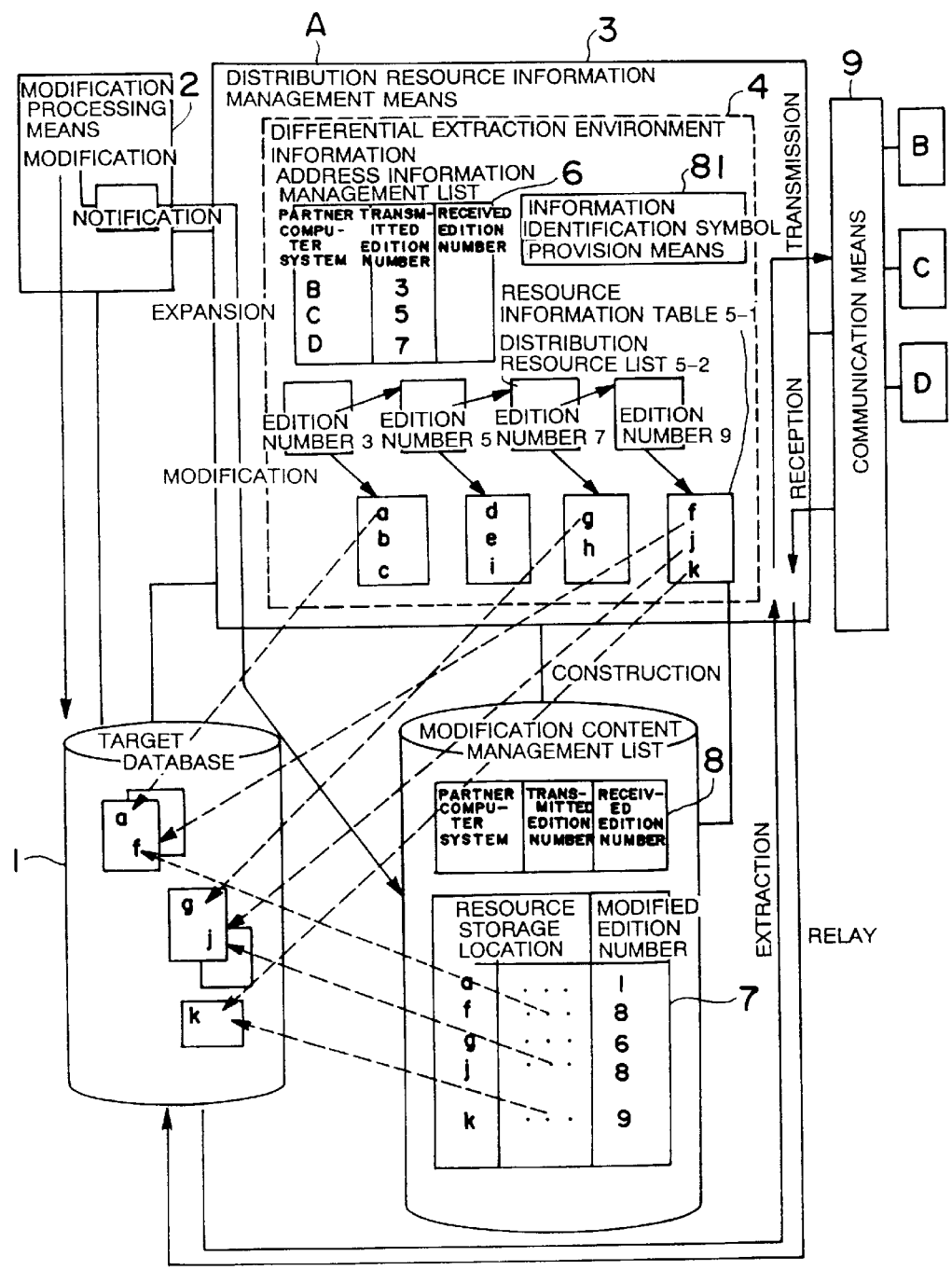

FIG. 2 is a theoretical structural diagram depicting the first embodiment of the present invention. This embodiment has a plurality of computer systems (A, B, C, D) distributed as information processing units on a network (NW). Hereafter, the terms "computer system", or simply "system", shall be used to refer to such information processing units.

Each computer system is a general-purpose computer system which consists of the mainframe; an example is a bank's deposits and savings system. Each system is equipped with a database 1. The individual computer systems can communicate with each other through the network (NW). Here, duplicates of the information stored in a given database 1 are distributed to the other computer systems (partner systems) through said network (NW). Since all of the systems have the same structure, the structure of system A will be discussed here.

Database and Definition Information

In FIG. 2, the computer system A of this embodiment has a database 1 that stores information as a resource under its own direct management. In expansion to the ordinary information for the management of this computer system, this database 1 stores the "definition information" that allows the individual systems to jointly use, via network communication, the resources of each of the individual systems. The database 1 that stores this definition information shall henceforth be referred to as the definition information database 1.

This definition information database 1 can be constructed so as to directly utilize existing databases 1 storing ordinary information, but can also be constructed as a dedicated database 1 to an external storage such as a magnetic disk system, which is prepared separately from such an existing database 1. For the sake of economy, moreover, it is preferable to use an existing database 1 such as that of this embodiment.

The definition information that is stored in the definition information database 1 of the given system is the definition information employed for the utilization of the resources of the given system itself; duplicates thereof are distributed to the other computer systems (partner systems) through the network (NW). The partner systems can utilize the definition information to access applications programs and terminals present in system A. The definition information is consequently information that is required for each of the systems in order to make use of the resources of the partner systems on the network (NW). As described above, in the present invention, the information that is distributed to each system is the "definition information" in this embodiment. When the definition information of a given system is modified, the contents of this modification must be relayed to the partner systems in order to enable subsequent communication.

Figure 3:
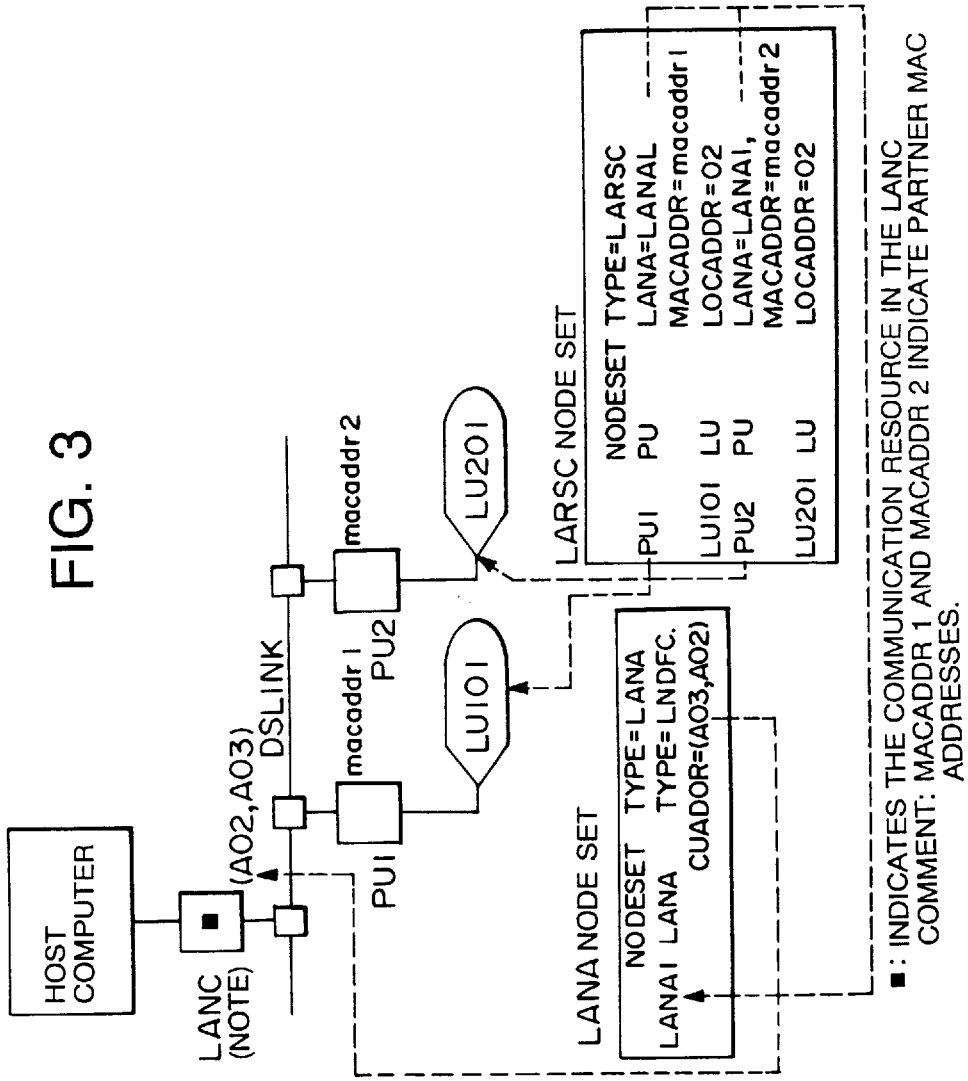

FIG. 3 depicts a specific example of this definition information. FIG. 3 depicts the definition of a LARCS node set; in FIG. 3, a LANA define statement (1) is a define statement for accessing the host LAN control unit, (2) on the PU define statement is a define statement for accessing the partner LAN control unit, (3) on the PU define statement is a define statement for accessing the terminal controller, and an LU define statement (4) is a define statement for accessing the terminal equipment. In this figure, from (3) to (1) indicates the LANA operand on the PU define statement, and from (4) to (3) indicates the hierarchy by the order of occurrence of the define statements. Such define statements are supplemented or modified when the resource is newly supplemented or modified.

This definition information is depicted in FIG. 2 by the alphabet a,b,c . . . f,j,k.

In the present invention, moreover, the information that is distributed to each system is not limited to such "definition information," but includes all the information managed by the own system. For example, when this system is the deposit and savings system of a bank, in order to back up the deposit and savings data thereof, duplicates of this data are transferred to the definition information databases 1 of the other computer systems. The present invention is also applicable to this situation, moreover, since the data must be relayed to the partner systems when the data is modified.

Modification Processor

Each of the computer systems has a modification processor 2 for expanding, modifying, or deleting the definition information of the definition information database 1, as shown in FIG. 2. When the definition information has been modified, this modification processor 2 notifies the distribution resource information manager 3, which describes the essence of the modification below.

The modification, e.g., expansion, modification, or deletion, of the defintion information, is performed by the operator running the system.

Distribution Resource Information Manager

Each computer system is provided with a distribution resource information manager 3. In FIG. 2, this distribution resource information manager 3 constructs a differential extraction environment 4 as a differential extractor 4, the differential between the definition information distributed to the partner computer system and the definition information that has been modified is extracted by this differential extraction environment 4, and this differential is transmitted to the partner computer system.

The differential extraction environment 4 performs management by providing an edition number to the definition information. Specifically, the edition number is the version number, and is the identification symbol which indicates the age of the definition information. A new edition number is provided every time the definition information is modified, and the old definition information and the new definition information are partitioned by this edition number. The old definition information is thus deleted from each definition information database 1, and only the new definition information is continually maintained in the datebase 1. The definition information can be specified by specifying the edition number. It is also possible to use an identification symbol other than the edition number, as long as the old and new definition information can be distinguished.

The definition information is recorded in the definition information database 1 in the position indicated in resource information table 5-1. A distribution resource list 5-2 is created for each edition number update, so that when a given distribution resource list 5-2 is referenced, the definition information with the edition number recorded in this distribution resource list 5-2 is referenced. The definition information recorded by this edition number is also contained in the distribution resource list 5-2, as long as the immediately preceding edition number has been deleted. Specifically, the definition information of the edition number recorded in this distribution resource list is referenced from the edition number that is newer, in the edition number order, than the edition number of the immediately preceding distribution resource list.

An address information management list is provided as an address information manager 6, and the transmitted definition information edition number and the received definition information edition number are recorded in this address information management list 6 for each partner computer system. Consequently, when the update of the definition information of the host system is transmitted to partner system, the address information management list 6 is referenced, the edition number of the lastest definition information attached to the transmitting system is verified, this edition number is compared with the edition number of the latest definition information of the system, and when the edition number of the transmitted definition information is old, the differential with the definition information with the new edition number is extracted, and this differential is transmitted to the partner system.

Modification Content Management List

Each computer system has a modification content management list 7 as a content modification manager. This modification content management list 7 stores the contents of the information modification when the definition information has been modified. "Contents of information modification" refers to the modified information which indicates, when the definition information with an edition number 5 has been modified to the definition information with an edition number 6, what part of the definition information with edition number 5 has been modified, and in what manner it has been modified, to produce the definition information with edition number 6. Specifically, not only is the definition information following modification itself stored, but the specific information indicating the expansion, modification, or deletion of the old definition information is also stored. This is the definition information differential brought about by modification. The modified information may be found by looking for the edition number. This modified information is distributed as the differential.

When definition information modification processing is performed by the modification processor 2, the contents of the modification are transferred to the modification content management list 7, and are managed based on the location in the definition information database 1 where the new definition information is stored and the edition number of this new definition information. A management table 8 similar to the address information management list 6 is simultaneously created, and the edition number transmitted by the computer system and the edition number received by the computer system are managed. In the distribution resource information manager 3, this management table 8 can be utilized as an address information management list 6 for constructing a differential extraction environment 4.

Communicator

The definition information differential extracted by the differential extraction environment 4 is transmitted over the network (NW) to the partner computer systems by a communicator 9 on the prompting of the distribution resource information manager 3. Since the definition information established by the partner computer system is transmitted in similar fashion from the partner computer system, the communicator 9 receives this and transfers it to the distribution resource information manager 3. With the distribution resource information manager 3, the received partner computer system definition information is relayed to the definition information database 1, and this definition information can be utilized to access the resources of the partner computer system. The received partner definition information edition number is simultaneously recorded for the partner system in management table 8 of the modification content management list 7.

Embodiment 1 Particulars

Embodiment 1 is described in further detail below

Figure 4:
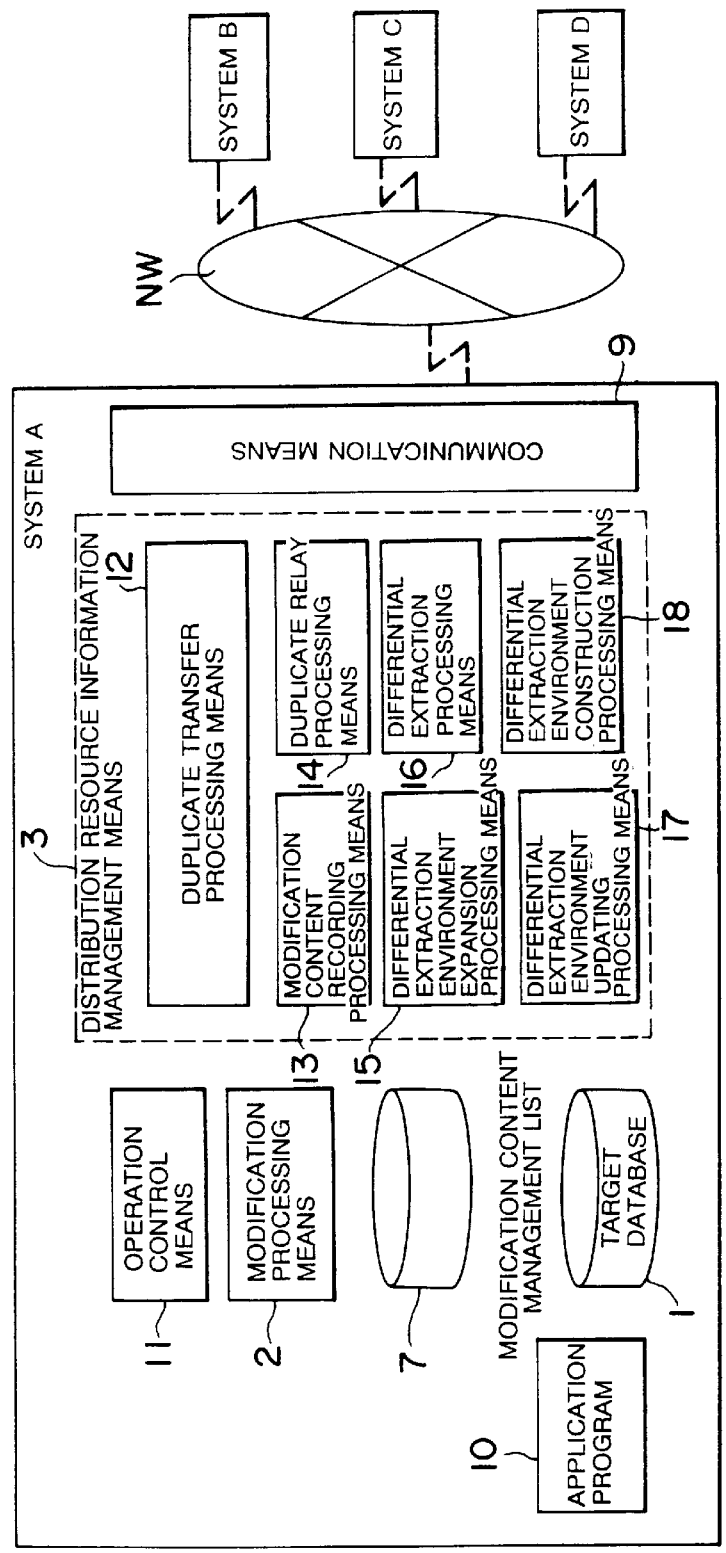

FIG. 4 illustrates the particulars of the computer system.

Application Program

An application program 10 is a program that utilizes the database 1, and is a program that, when the definition of a resource on the network (NW) is managed, as in the case of this embodiment, effects communication by utilizing the definition thereof.

Operations Controller

The system is provided with an operations controller 11. This operations controller 11 prompts the distribution resource information manager 3 to replace the differential with all of the partner computer systems at the time of computer system start-up. "Differential replacement" refers not only to the replacement of the definition information differential of the given system, but also of the definition information differential of the partner computer system.

However, this may also simply indicate either the transmission to or reception from the partner computer system of the definition information differential of the given system.

This operations controller 11 can prompt the replacement of the differential with the partner computer system when it is required that the definition information received from the partner computer system match the latest definition information of the partner computer system. In this case as well, this may also simply indicate the transmission to the partner computer system of the definition information differential of the given system.

Distribution Resource Information Manager

The distribution resource information manager 3 is furnished with a duplicate transfer processor 12, a modification content recording processor 13, a duplicate relay processor 14, a differential extraction environment expansion processor 15, a differential extraction processor 16, a differential extraction environment updating processor 17, and a differential extraction environment constructor 18. The particulars of each component are described below.

Duplicate Transfer Processor

The duplicate transfer processor 12 effects differential extraction at the differential extraction environment 4 when a prompt for the transmission or replacement of the differential between the old and new definition information has been received from the operations controller 11, e.g., when there has been a request from a partner system; the differential between the old definition information contained in the partner computer system and the new definition information is then transmitted to the partner computer system.

Alternatively, the duplicate transfer processor 12 also makes it possible to transmit the differential between the old definition information contained in the partner computer system and the new definition information to the partner computer system when the contents of modified definition information have been received from the modification processor 2, i.e., every time there is a modification.

When there is a plurality of partner computer systems, moreover, the edition numbers of the duplicates of the definition information of the host computer system that are contained in the partner computer systems differ depending on the state of operation of the partner computer systems, and the definition information differentials (the modified information) consequently also differ from system to system. Consequently, when there is a plurality of partner computer systems, the definition information differentials that differ depending on the partner computer system are transmitted. There are cases in which the following may occur: for example, with system A, although a modification to definition information with an edition number of 9 has been brought about, the edition number of the duplicate of the definition information of system A that has been transmitted to the partner computer system B is still only 7, and the edition number of the duplicate of the definition information of system A that has been transmitted to another partner computer system C is 8. This results in each system being operated independently. In such cases, the differential between definition information with an edition number of 9 and definition information with an edition number of 7 is transmitted to the computer system B, and the differential between the definition information with an edition number of 9 and the definition information with an edition number of 8 is transmitted to the computer system C.

There are also cases in which the definition information of the partner computer systems are received; in this case, the differential between the definition information of the partner computing system and the definition information of the partner computer system that is contained by the given system is requested from the partner computer system.

Modification Content Recording Processor

The modification content recording processor 13 records the modified information of the definition information database 1 in the modification content management list 7 on the instructions of the duplicate transfer processor 12. For example, the LANA define statement (1), (2) on the PU define statement, (3) on the PU define statement, and LU define statement (4) in FIG. 3 form edition number 8. When there is a modification of the information, not only is the modified part recorded in the modification content recording management list 7, but the fact that the definition information of the resource has been modified is also recorded. More specifically, the location in which the information is stored, the modified segment, and the edition number of the modification operation are updated to the resource name, as in the case of the resource information management list of FIG. 7. Although there are units for accessing the database for every resource, a relational database or the like may be used to access the individual operand units of this resource; taking such cases into consideration (e.g., when the MACADDR operand of the PU define statement has been modified), the classification of the modified operand is recorded/updated. In this case as well, the value to which the operand value has been modified is not recorded. The edition number following modification is thus set to 9.

Differential Extraction Environment Constructor

The differential extraction environment constructor 18 constructs a differential extraction environment 4, such as that described above, based on instructions from the modification content recording processor 13 or the duplicate transfer processor 12.

Here, as shown in FIG. 2, the differential extraction environment 4 is furnished with a resource information table 5-1, a distribution resource list 5-2, and an address information management list 6. The differential extraction environment 4 is described in detail below.

FIG. 5 is the address information management list 6 provided to system A. With this address information resource list 6, the edition number of the information that has been transmitted is recorded in the partner computer system. The edition number of the "definition information in the partner computer system" that has been transmitted to the host computer system A from the partner computer system is managed simultaneously.

Figure 6:
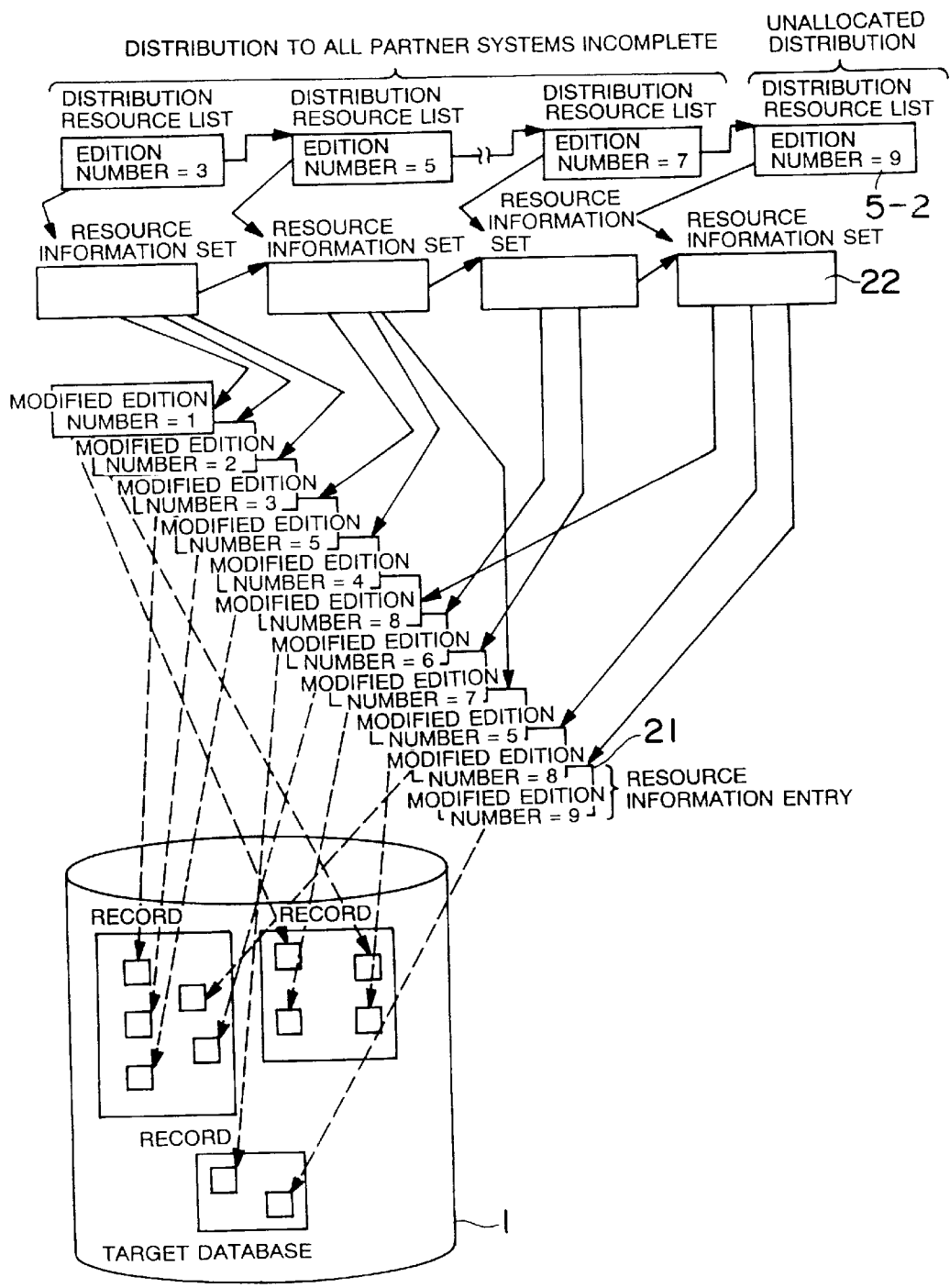

The differential extraction environment 4 creates a modified information extraction table for extracting said modified information. This table is furnished with the resource information table 5-1 and the distribution resource list 5-2. More specifically, it is furnished with a distribution resource list 5-2 created for each transmitted address information management list 6 edition number; one or a plurality of resource information entries 21 such as that shown in FIG. 6 are controlled in such a way that the transmitted edition number of the distribution resource list 5-2 is not exceeded, to form a plurality of resource information sets 22, which are then controlled. The resource information set 22 may be omitted, and the distribution resource list 5-2 may directly manage the resource information entries 21.

When there are resource information entries 21 for an edition number that exceeds the latest transmitted edition number of the edition numbers that have been transmitted to each of the partner systems, distribution resource lists 5-2 are also created for edition numbers whose resource information entries 21 have been subjected to the latest modifications. These distribution resource lists 5-2 are ordered in a queue in the order of the edition numbers.

Here, the "edition number" is the time of modification of the most recently modified information of that distributed to the partner systems.

The resource information entries 21 are obtained by recording the modified segment, the edition number of the modified definition information, and the location in the definition information database 1 in which the definition information is stored for the definition information (a,b,c . . . ) as resource names in the resource information management list formed in the modification content management list 7, as shown in FIG. 7. "Modified segment" refers to the type of modification, e.g., expansion, alteration, or deletion.

By referring to the distribution resource list 5-2, the resource information entry F1 is referenced via the resource information set 22, thereby making it possible to specify the untransmitted modified information. Specifically, when the modified definition information is distributed to a certain partner computer system, the edition number that has been transmitted to the partner computer system is found by the modified information management list (address information management list 6) in the differential extraction environment 4, and, if there is distribution resource list 5-2 subsequent to the distribution resource list 5-2 that matches this edition number, modified information is known to be present; the stored location of the modified information of the various resources in the resource information table 5-1 which pertains to these distribution resource lists 5-2 (the unit indicating the information stored in the target definition information database 1 is the resource) is then used to read the modified information. It is thereby possible to extract the modified information that is to be relayed to the partner computer systems to which it is to be distributed without affecting the programs that utilize the existing definition information databases 1.

Differential Extraction Environment Expansion Processor

The differential extraction environment expansion processor 15 expands the differential extraction environment 4 based on instructions from the modification content recording processor 13 so that the differential can be extracted for the modified contents of the definition information database 1.

Specifically, when definition information has been modified, a new modification edition number is created, and the resource information management list of the modification content management list 7 is updated as a resource information entry 21. This resource information entry 21 is incorporated into the resource information set 22. When necessary, moreover, a new resource information set 22 is created, and a distribution resource list 5-2 is created.

Differential Extraction Processor

The differential extraction processor 16 extracts a suitable differential using the differential extraction environment 4 based on instructions from the duplicate transfer processor 12.

Specifically, when differential information is sent to a partner computer system or when there is a request for resource referencing from a partner computer system due to definition modification in the given system, the edition number of the definition information transmitted to the partner system is verified. The definition information with this edition number is definition information that is currently contained in the partner computer system. When the edition number of the partner computer system is the latest edition number, it is left unchanged, but when it is not the latest edition number it is an old edition number, and the differential between the definition information having the old edition number and the definition information having the latest edition number is extracted.

Duplicate Relay Processor

The duplicate relay processor 14 relays the differential received from the partner computer system to the definition information database 1 based on instructions from the duplicate transfer processor 12.

Specifically, the definition information differential extracted by said differential extractor 4 is sent to the partner system, and, with a partner system that has received this, is relayed to the definition information database 1 based on instructions from the duplicate transfer processor 12.

Differential Extraction Environment Updating Processor

The differential extraction environment updating processor 17 transmits the differential to the partner computer system based on instructions from the duplicate transfer processor 12; the differential extraction environment having an edition number that will become superfluous is eliminated as a result. This is explained below using FIG. 8. Looking at the information managed by the address information management list 6, the transmitted edition number of the partner system B is 3, the transmitted edition number of the partner system C is 5, and the transmitted edition number of the partner system D is 7. Here, the definition information of the computer system A that is connected to the network (NW) is updated to edition number 9, and, when the differential for the definition information of the modified edition number 9 is sent to system C, and the system that utilizes edition number 5 ceases to exist. System B, moreover, has a transmitted edition number of 3, and the information that should be transmitted is consequently the definition information that is newer than edition number 3 and that comes up to the latest edition number of 9. System D, moreover, has a transmitted edition number of 7, and so that information that is to be transmitted in this case is the definition information that is newer than edition number 7 and that comes up to the latest edition number of 9. Since the distribution resource list 5-2 for edition number 5 thus becomes superfluous, it is deleted.

When transmission has been effected to bring all of the partner systems up to the latest edition number, and the latest edition number is unnecessary, the lowest edition number 3 is not deleted, for the sake of system recovery when the system goes down.

Differential Extraction Environment Construction Processor

The differential extraction environment construction processor 18 is a processor for constructing said differential extraction environment 4; when a differential extraction environment 4 is not constructed during system start-up, the differential extraction environment 4 is constructed at the request of the operations controller 11.

Communicator

The communicator 9 connects the system to the network (NW) and performs the transmission and reception of information with the partner systems. The information that is transmitted and received includes the information handled by the system as well as the definition information.

The Effects of Embodiment 2

The effects of this embodiment are described below with reference to the flow charts of FIGS. 9 through 15.

Transfer of Differential During Definition Information Modification

Differential transfer when the definition data has been modified will be explained first using FIG. 9.

* Behavior at Host Computer System (System A)

(1) The modification processor 2 effects the modification, expansion, updating, or the like of the definition information stored in the definition database 1 under the control of the system (step 101). The modification, expansion, or updating of the definition information is carried out when a network (NW) resource (terminal, terminal controller, application program, or the like) has been expanded, deleted, or modified.

(2) The duplicate transfer processor 12 is then notified of the contents of the modification (step 102). The noted contents of the modification comprise the edition number of the modify operation, the name of the resource modified and the modified segment, and the location in which the information is stored.

(3) The duplicate transfer processor 12 requests the recording of the contents of modification from the modification content recording processor 13 (step 103).

(4) The duplicate transfer processor 12 references the address information management list 6 for each partner computer system, and obtains the edition numbers of the transmitted information (step 104). Specifically, it checks whether or not the partner computer system contains definition information having a certain edition number.

(5) The extraction of the differential subsequent to the edition number of the transmitted information is then requested from the differential extraction processor 16 (step 105). Specifically, the differential between the definition information contained by the partner computer system and the latest definition information is extracted.

(6) If the differential can be extracted, the communicator 9 is used to transmit the differential to the partner computer system (step 106). (When the differential is transmitted to the partner computer system, the edition number of this differential is also transmitted. The edition number of the differential is the latest information of the edition number in which the resource information contained in this differential has been modified.)

Here, not only is the differential transmitted, but the definition information having an edition number following modification is transmitted unaltered, and can also be substituted for definition information having an old edition number; in this case, however, a considerable amount of information is communicated, and a considerable amount of time may thus be required for processing.

* Behavior at Partner Computer System (System B or the like)

(7) At the partner computer system, the duplicate transfer processor 12 receives the differential via the communicator 9 (step 107).

(8) The duplicate transfer processor 12 requests the relay of the received differential from the duplicate relay processor 14. The duplicate relay processor 14 thus relays the received differential to the definition information database 1 (step 108).

(9) If the relay of the differential is successful, the duplicate transfer processor 12 updates the edition number of the address information management list 6 received information (step 109).

(10) The duplicate transfer processor 12 acknowledges the success of the differential relay to computer system A (step 110).

As described above, it is possible to utilize the host system (system A) in various ways, depending on the definition information updated by the partner system.

Specifically, the definition of a resource on the network that exists in the host system is transmitted to a partner system, and the partner system holds a duplicate that, based on this definition, has been converted to a definition seen from the partner system. This makes it possible for a network resource that exists in the host system to be used from a partner system as well.

* Behavior at Host System (System A)

(12) If an acknowledgement of the success of the relay of the differential has been received, the duplicate transfer processor 12 updates the edition number of the transmitted information of the address information management list 6 to the edition number of the latest transmitted definition information (step 111).

(13) As a result of the extraction of this differential, when an edition number that has been rendered superfluous by subsequent differential extraction is produced, the differential extraction environment updating processor 17 deletes the superfluous edition number from the differential extraction environment (step 112).

(14) Finally, a check is performed to determine whether the processing to all of the partner computer systems has been completed (step 113), and if it has been completed then processing is ended.

Differential Transfer During Computer System Start-Up

The transfer of the definition information differential during computer system start-up is described below using FIG. 10.

* Behavior at Host Computer System (System A)

(1) During computer system start-up, the operations controller 11 prompts the replacement of the differentials with all of the partner computer systems to the duplicate transfer processor 12 (step 201).

(2) The duplicate transfer processor 12 references the address information management list 6 for every partner computer system and obtains the edition number of the received information (step 202).

(3) The received edition number is sent to the partner computer system through the communicator 9, prompting the transmission of the differential (step 203). For example, if the latest definition information edition number for partner system B is 5, but the edition number of the definition information received at the host system from a separate partner system is 3, then this differential is requested from the partner system.

* Behavior at Partner Computer System (System B or the like)

(4) The duplicate transfer processor 12 receives the prompt for the transmission of the differential via the communicator 9 (step 204).

(5) The duplicate transfer processor 12 checks to see whether a differential extraction environment 4 has been constructed (step 205).

(6) If a differential extraction environment 4 has not been constructed, this construction is requested from the differential extraction environment constructor 18 (step 206).

(7) The duplicate transfer processor 12 requests the extraction of the differential from the differential extraction processor 16 based on the edition number of the information that has been received from system A (step 207).

(8) The duplicate transfer processor 12 responds with either "no differential information" or with "differential information extracted" as a result of differential extraction (step 208). "No differential information" occurs when the definition information edition numbers of systems A and B are the same.

(9) The duplicate transfer processor 12 thus updates the edition number of the transmitted information of the address information management list 6 (step 209).

(10) As a result of extracting this differential, an edition number that has become superfluous through subsequent differential extraction is deleted from the differential extraction environment 4 (step 210).

* Behavior at Host Computer System (System A)

(11) The duplicate transfer processor 12 of the host computer system A receives the differential extracted in step 208 via the communicator 9 (step 211).

(12) The duplicate transfer processor 12 requests the relay of the received differential from the duplicate relay processor 14, and the duplicate relay processor 14 relays the differential upon request to update the definition information on the definition information database 1 (step 212).

(13) If the relay is successful, the duplicate transfer processor 12 updates the edition number of the received information of the address information management list 6.

(14) If reception from all of the partner computer systems has ended (step 214), differential distribution is performed to all of the partner computer systems. The processing for differential distribution is the same as the processing in FIG. 9 subsequent to step 104.

Processing by the Modification Content Recording Processor

Figure 11:
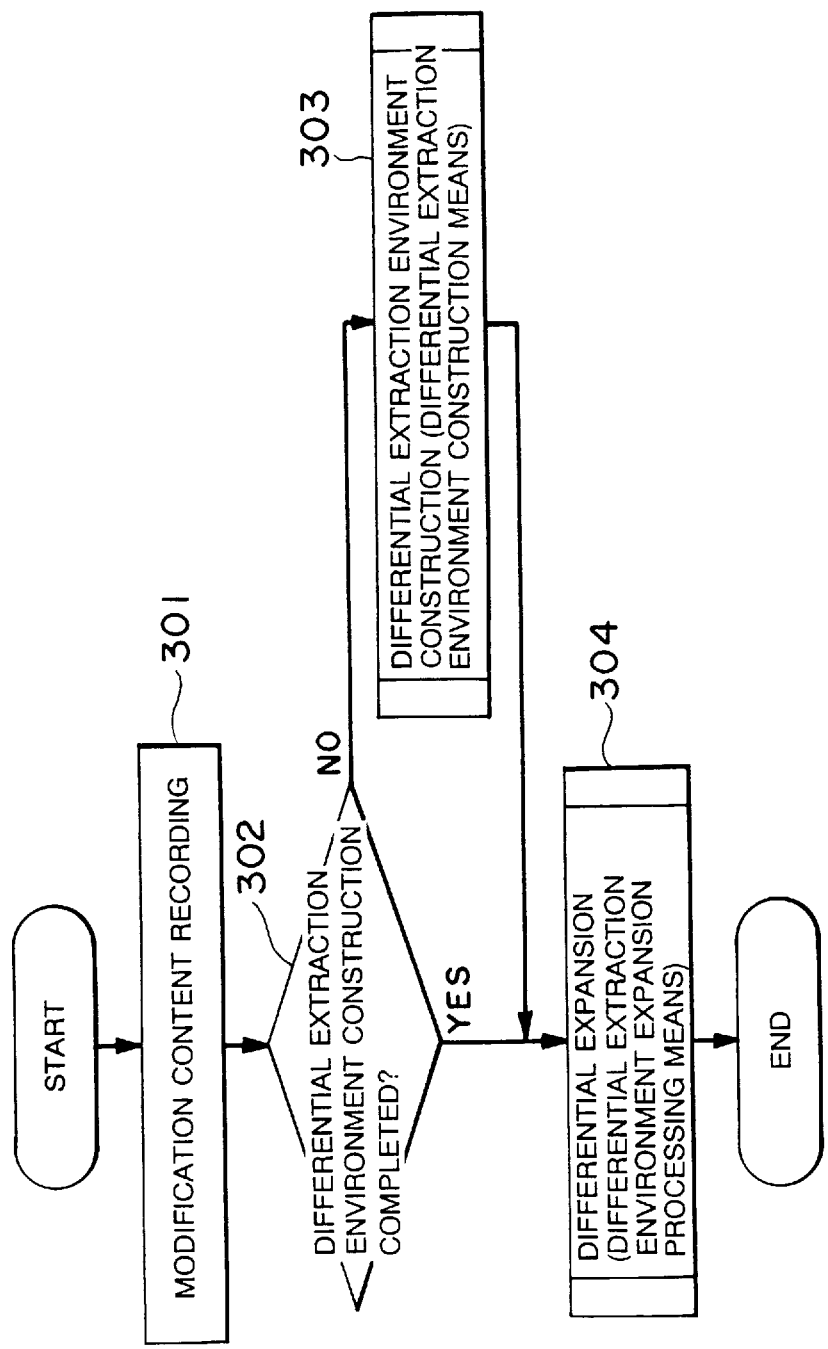

The processing by the modification content recording processor 13 is described below through FIG. 11.

(1) The modification content recording processor 13 records the contents of the modification to the resource information management list (step 301). The recorded modification contents comprise the definition information name (resource name), the location in the definition information database 1 where the information is stored, the modified edition number, and the segment modified, e.g., expanded, updated, deleted.

(2) A check is then performed to determine whether a differential extraction environment 4 has been constructed (step 302).

(3) If a differential extraction environment 4 has not been constructed, this construction is requested from the differential extraction environment construction processor (step 303).

(4) If a differential extraction environment 4 has already been constructed, the expansion of the differential extraction environment 4, with the modification contents as the differential, is requested to the differential extraction environment expansion processor 15 (step 304).

Processing of the Differential Extraction Environment Construction Processor

Figure 12:
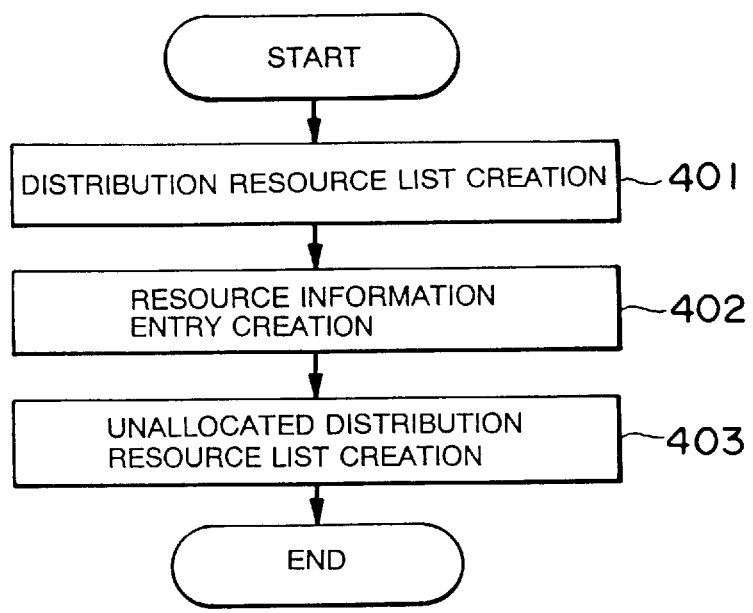

Processing of step 303 above is described in detail through FIG. 12.

Figure 8:
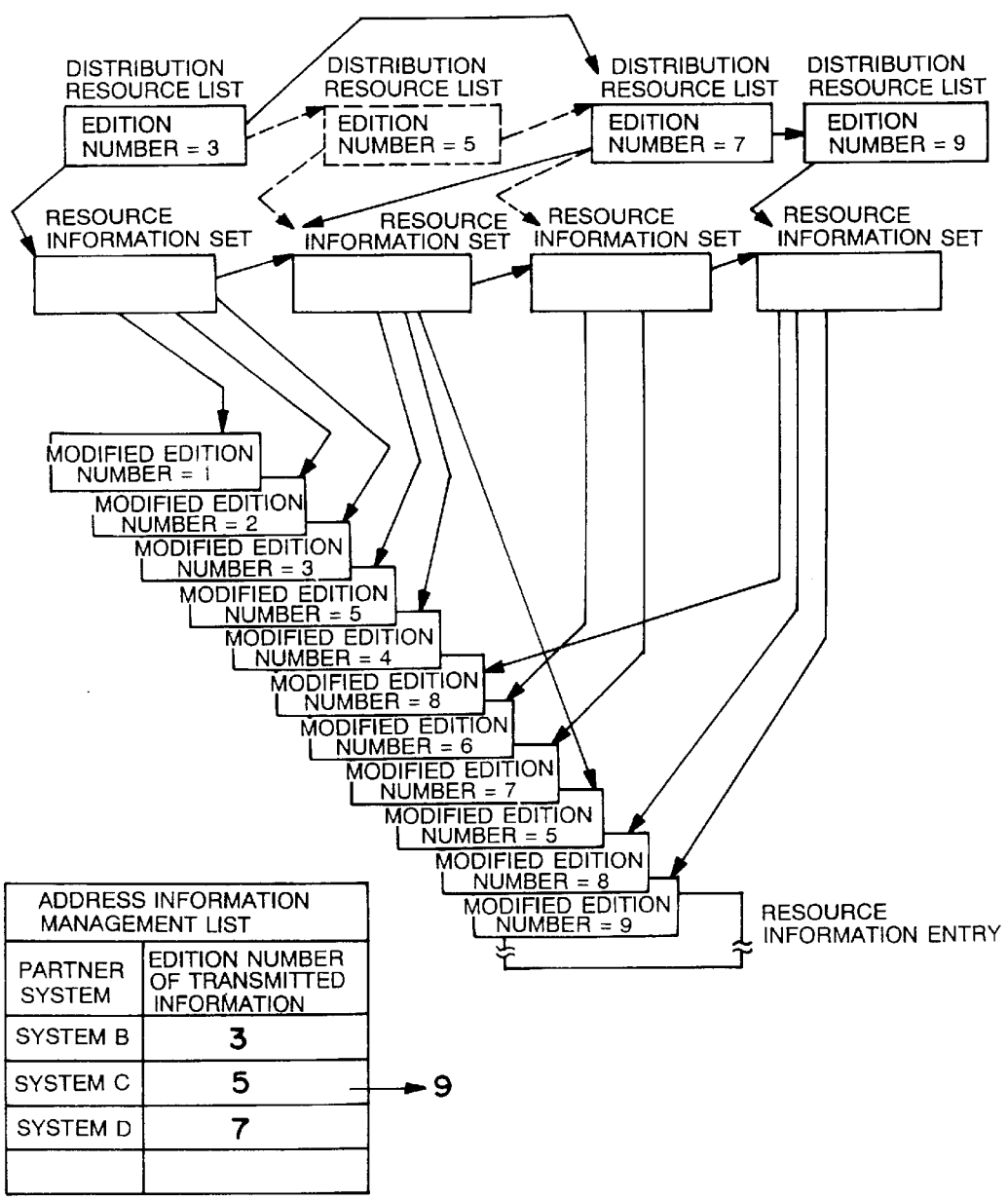

The differential extraction environment construction processor constructs the differential extraction environment 4 shown in FIGS. 6 and 8.

(1) First, a distribution resource list 5-2 is created (step 401). A distribution resource list 5-2 is created in edition number order for the edition numbers of the transmitted information of the address information management list 6. Only one is created when the edition numbers are the same.

Although distribution is effected to several partner computer systems for these edition numbers, there is the possibility that distribution will not be completed to all of the partner computer systems. For example, in FIG. 8, the resource (definition information) up to transmitted information edition number 5 has been distributed to systems C and D, but has not yet been distributed to system B. The distribution resource list 5-2 is held until resource distribution to all the systems has ended.

(2) A resource information entry 21 is then created (step 402).

A resource information entry 21 is created for each resource of the resource information management list, i.e., for each definition information. These are controlled and connected by a resource information set 22 to a distribution resource list 5-2 that does not exceed the edition number of the transmitted information created in step 401 (and arranged in edition number order).

(3) A distribution resource list 5-2 is created for the unallocated part (step 403).

Here, a resource information entry 21 that does not exceed the edition number of the transmitted information of the distribution resource list 5-2 created in step 401, i.e., a resource entry that has not yet been distributed to any partner computer system, is controlled in similar fashion by a resource set, and a distribution resource list 5-2 is created for this purpose, and is added at the end of the distribution resource list 5-2 queue. The latest resource information entry 21 edition number is provided for the edition number of the transmitted information of this distribution resource list 5-2.

Processing of the Differential Extraction Environment Expansion Processor

Figure 13:
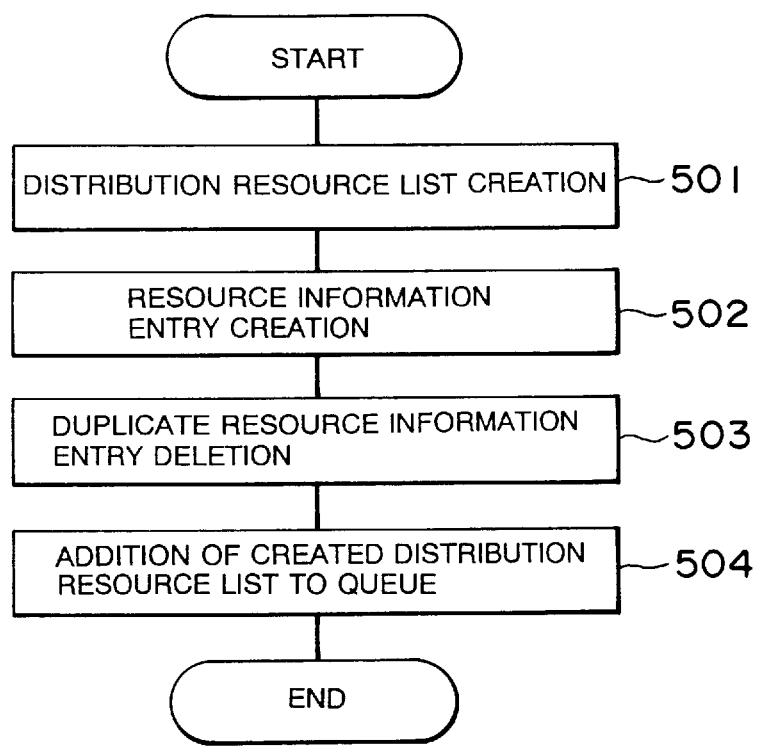

The processing of step 304 above is described in detail through FIG. 13.

(1) The differential extraction environment expansion processor 15 receives the contents of the definition information modification, and creates a distribution resource list 5-2 (step 501).

(2) A resource information entry 21 is created for each resource (each definition information), and these are controlled and connected to the distribution resource list 5-2 created in step 501 by a resource information set 22 (step 502).

(3) At this point, a resource information entry 21 that has been prepared by expanding or updating by means of a previous modification procedure exists for an updated or deleted resource information entry 21. This is retrieved and deleted to prevent the double extraction of the same resource in differential extraction (step 503).

(4) The distribution resource list 5-2 created in step 501 is added to the end of the distribution resource list 5-2 queue (step 504). At this time, a check is performed to determine whether there is a partner system that requires the current latest edition number. If there is not one, then the distribution resource list is deleted, and incorporated into a distribution resource list that expands the resource information set connected to this distribution resource list.

Differential Extraction Processor

Figure 9:
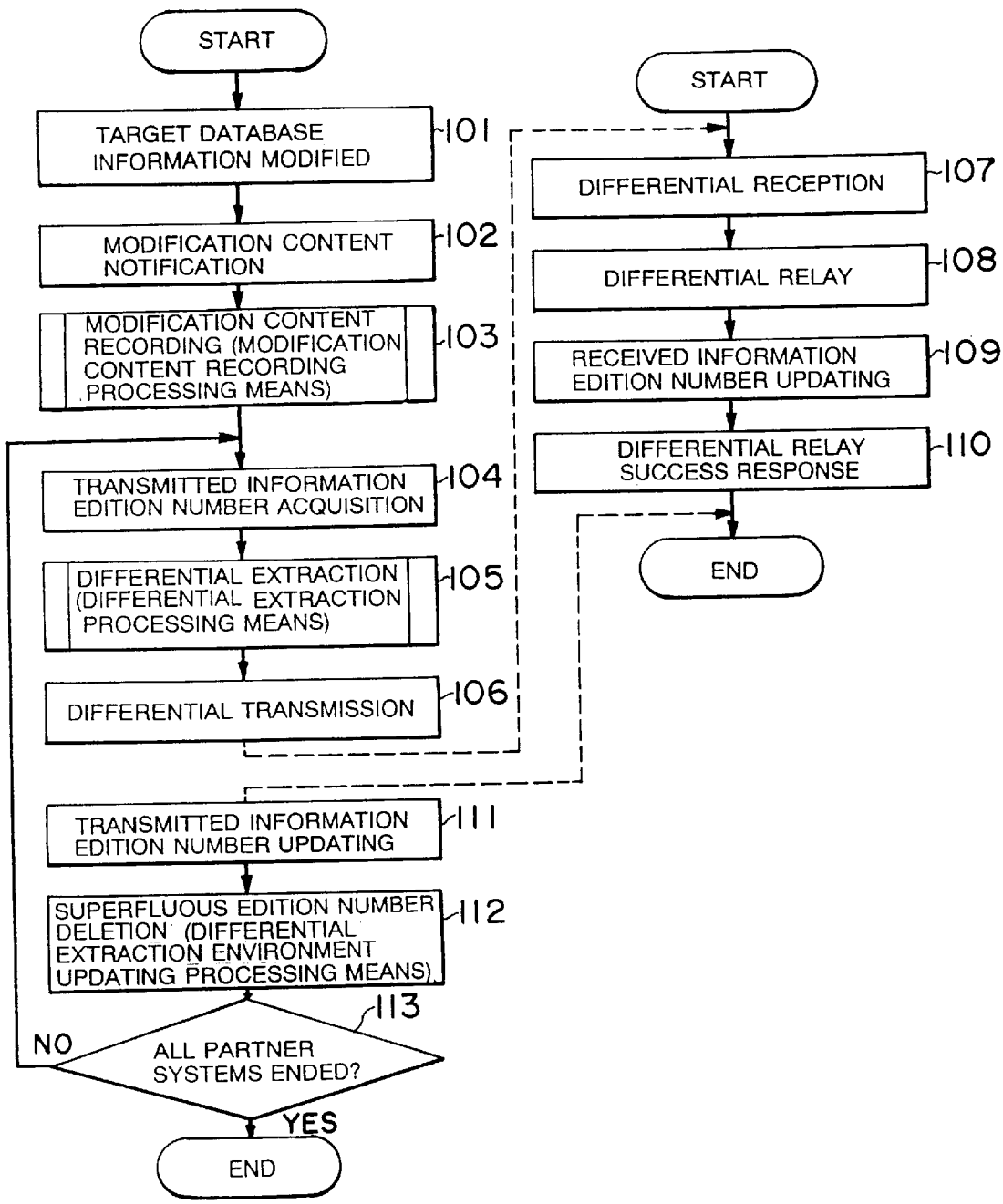
Figure 10:
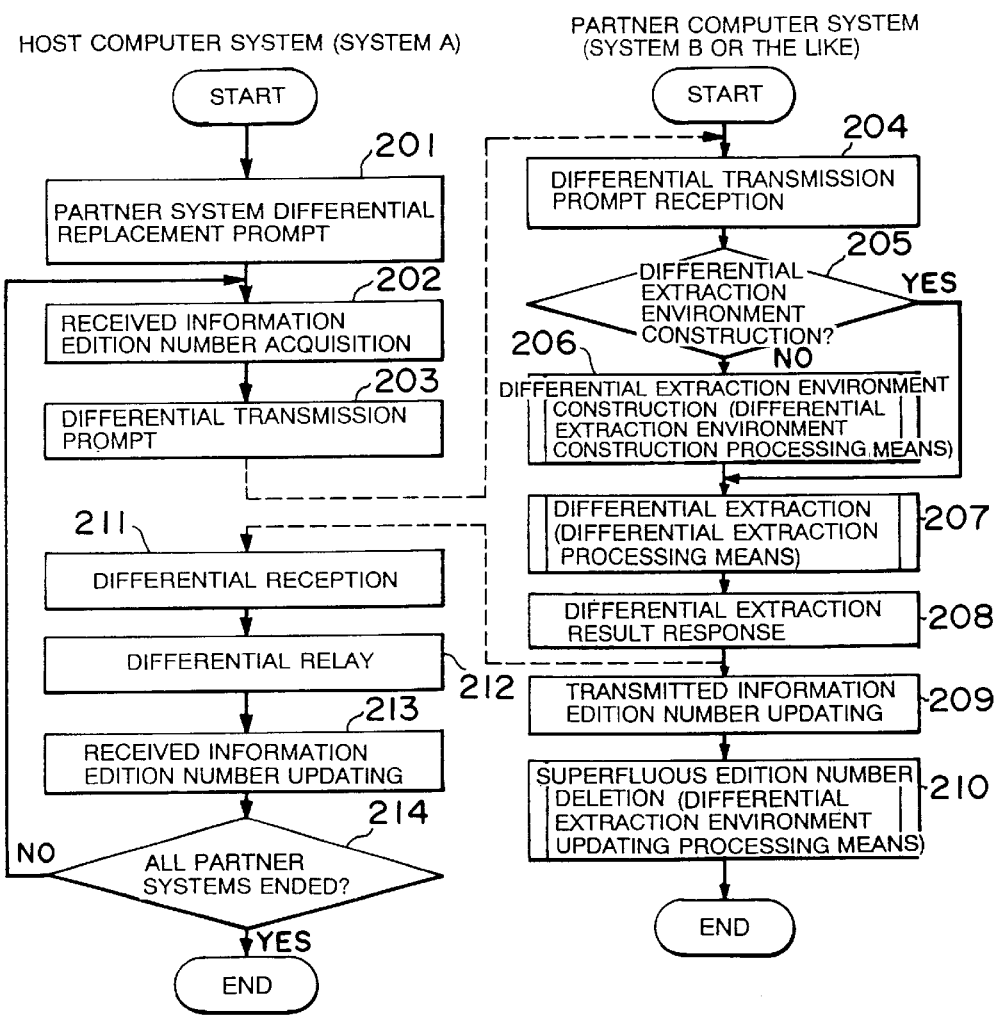
Figure 14:
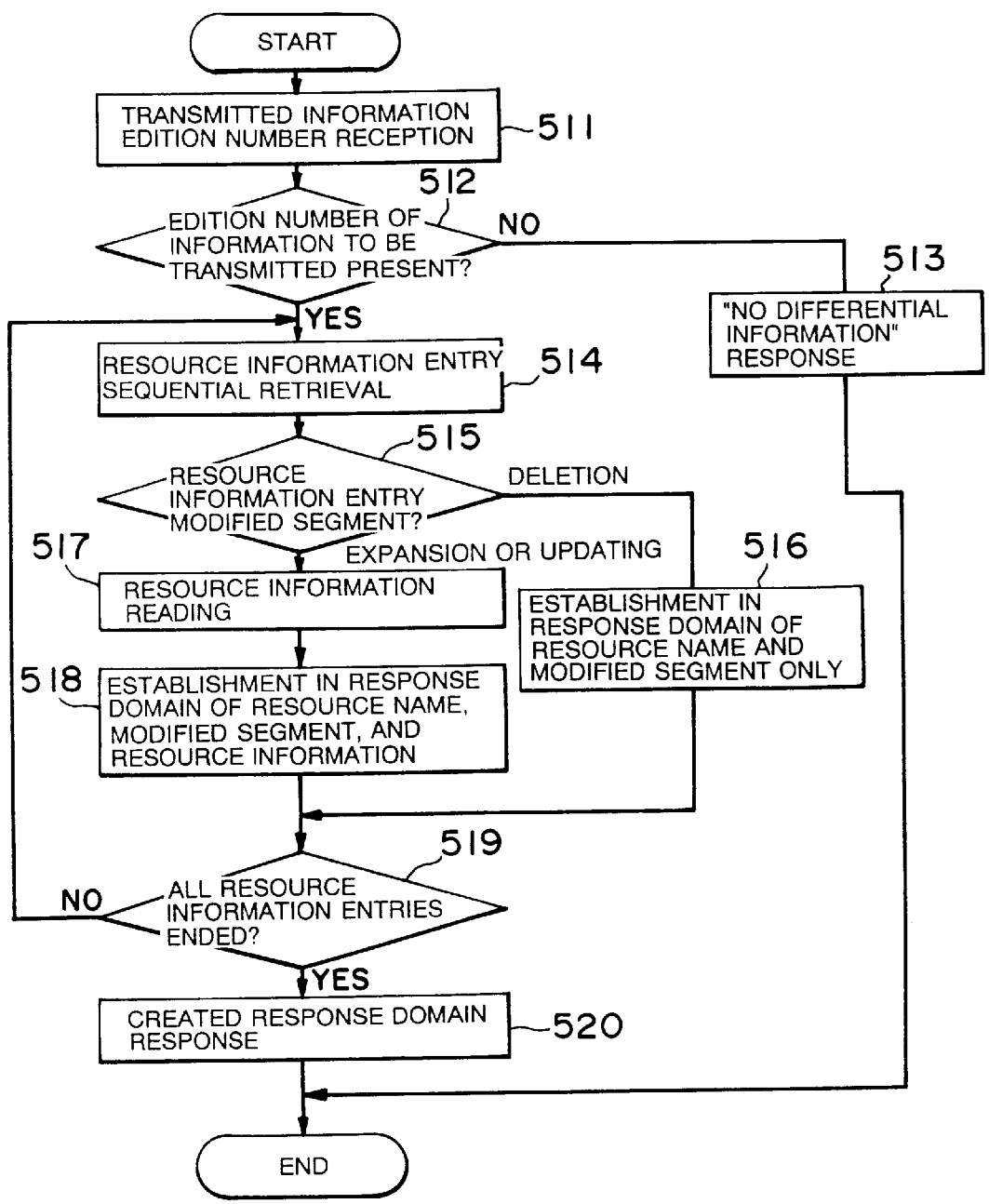

The processing of step 105 in FIG. 9 and step 207 in FIG. 10 is described in detail through the flow chart of FIG. 14.

(1) The differential extraction processor 16 receives the edition number of the transmitted information (step 511).

(2) The distribution resource list 5-2 queue is retrieved, and a check is performed to determine whether there is a distribution resource list 5-2 with an edition number later than the edition number of this transmitted information (step 512).

(3) If the distribution resource list 5-2 in question is not found as a result of step 512, a "no differential information" response is generated (step 513).

(4) As a result of step 512, if the distribution resource list 5-2 in question is found the distribution resource list 5-2, resource information set 22, and resource information entry 21 subsequent to this distribution resource list 5-2 are retrieved in order (step 514).

(5) A check is performed to determine the modified segment of the resource information entry 21 retrieved (step 515).

(6) If the modified segment is the product of a deletion, only the resource name and the modified segment are established in the response domain (step 516). "Establishment in the response domain" refers to the preparation of a domain in the memory, and the establishment of the modified information in this order, in order to collectively respond to the modified information of a plurality of resources.

(7) If the modified segment is a product of expansion or updating, the information in the resource information entry 21 (the location in the definition information database 1 where the information is stored) is used to read the definition information that is the resource information (step 517).

(8) The resource name (definition information name), modified segment, and resource information (definition information) are then established in the response domain (step 518).

(9) If the processing of all of the resource information entries 21 has been completed (step 519), the response domain that has been created is answered (step 520). Specifically, the information within the response domain is transmitted to the partner computer system.

With the embodiment, the smallest unit for managing the information is the definition information of the resource. This smallest unit is made the operand of the definition information of the resource, the type of the operand having a modification is held in the resource information entry, and when the differential is read the contents of the operand thereof are read and established in the response domain.

Processing of the Differential Extraction Environment Updating Processor

Figure 15:
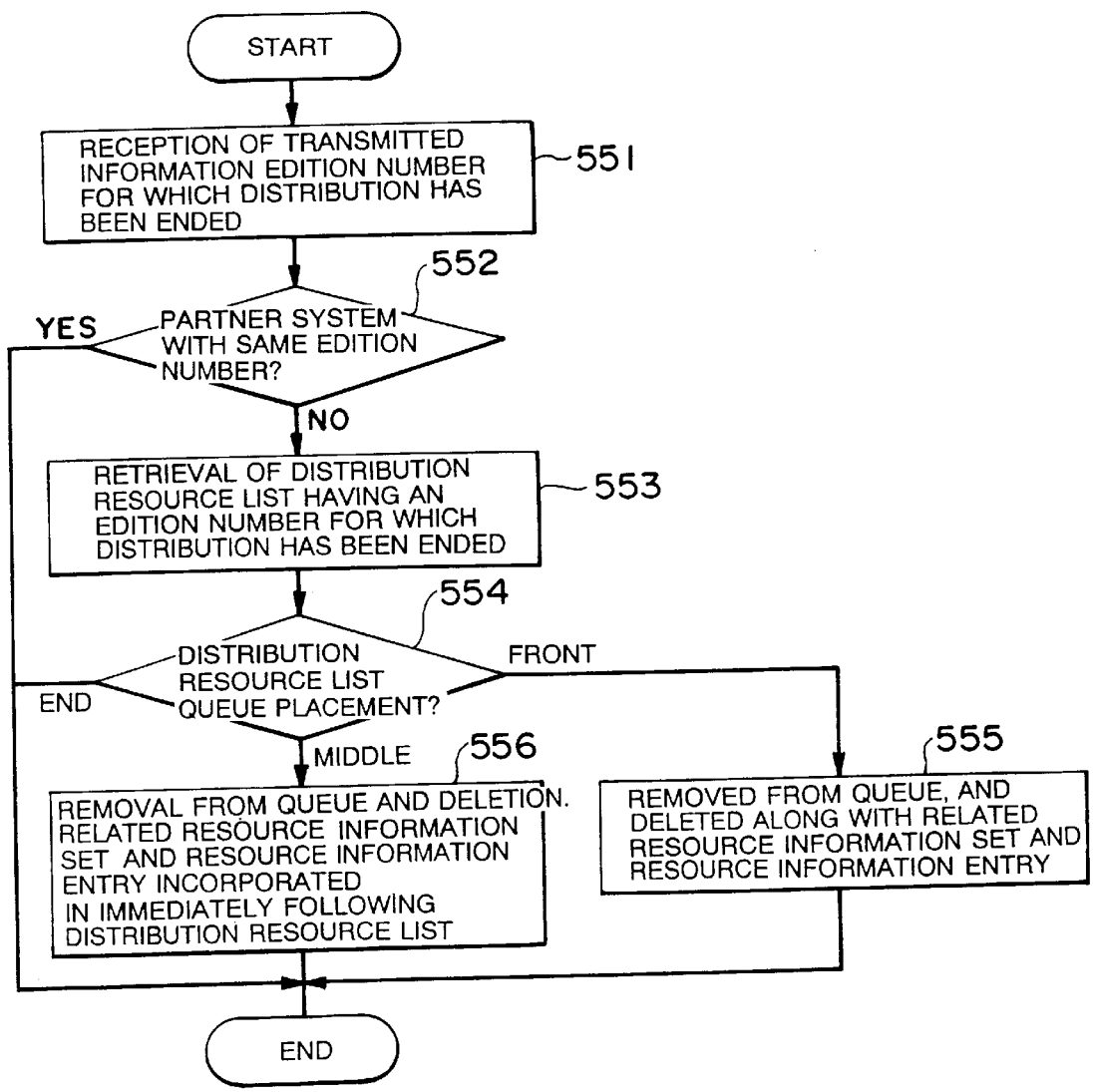

Differential extraction environment updating processing is described below through FIG. 15.

(1) The differential extraction environment updating processor 17 receives the edition number of the transmitted information for which distribution has been ended (step 551).

(2) The address information management list 6 is then checked to determine whether there is a partner computer system with the same edition number as the edition number of this transmitted information (step 552).

(3) If a matching partner computer system is not found, since differential extraction is unnecessary for this edition number, the distribution resource list 5-2 that matches this edition number is retrieved (step 553).

(4) When the distribution resource list 5-2 that has been found is at the head of the distribution resource list 5-2 queue (step 554), since the differential up to this edition number is distributed to all of the partner computer systems, this distribution resource list 5-2 is removed from the queue, and the related resource information set 22 and resource information entry 21 are both deleted (step 555).

(5) When the distribution resource list 5-2 that has been found is in the middle of the distribution resource list 5-2 queue, since there are no partner computer systems that require differential extraction using this edition number, this distribution resource list 5-2 is removed from the queue and deleted. However, the related resource information set 22 and resource information entry 21 are not deleted, but are incorporated into the next distribution resource list 5-2 (step 556). Specifically, this is because of the need to extract these resource information entries 21 as differentials when a differential is extracted at an edition number earlier on the distribution resource list 5-2 queue than this distribution resource list 5-2. FIG. 8 depicts a situation in which edition number 5 becomes superfluous.

(6) When the distribution resource list 5-2 that has been found is at the end of the distribution resource list 5-2 queue, since the differential up to this edition number has not yet been distributed to any partner computer systems other than the partner computer system to which it is distributed at this time, it is left unaltered.

The Relationship Between Computer Systems Having Different Edition Numbers

Transmission or reception failure or the like may result in discrepancies in the edition numbers transmitted and received by partner computer systems. To deal with such instances, not only does each computer system hold the latest edition number definition information, but each partner computer system also holds the definition information of the edition number received before this in a plurality of levels. This allows the partner computer system to transmit modified information to match the edition number previously received, in the event of such a discrepancy.

The Merits of Embodiment 1

As is clear from the above description, this embodiment has the advantages detailed below when duplicates of the information on a given computer system are distributed to other computer systems over a network (NW) to which a plurality of computer systems are connected.

Since the information that is modified is selectively managed in the management of the modified contents of the definition information database 1, it is possible to extract the modified information without affecting the conventional definition information database 1 that is the target or the programs that utilize it.

As a result, it is possible to reduce the amount of data communication compared to methods that distribute all of the information, and since the modified information itself is stored separately, the space that is required for it is not needed.

As far as the problem of the times at which distribution is accomplished differing due to a given computer system shutting down and distribution failing, since the modified information is extracted after the times differ for each of the partner computer systems, the interdependency of the computer systems is eliminated, and each of the individual computer systems on the network (NW) can be shut down and restarted independently without error.

As far as the problem of the clocks of the computer systems on the network not being synchronized during the management of the communication cut-off point, since the relay of information is managed by the edition number of the modified information, and not by the time at which the relay is performed, the modified information can be transmitted and received without depending on the clocks of the partner computer systems.

Embodiment 2

Embodiment 2 is an embodiment that achieves the third object, and is an example related to the intersystem transmission and reception of definition information.

Figure 16:
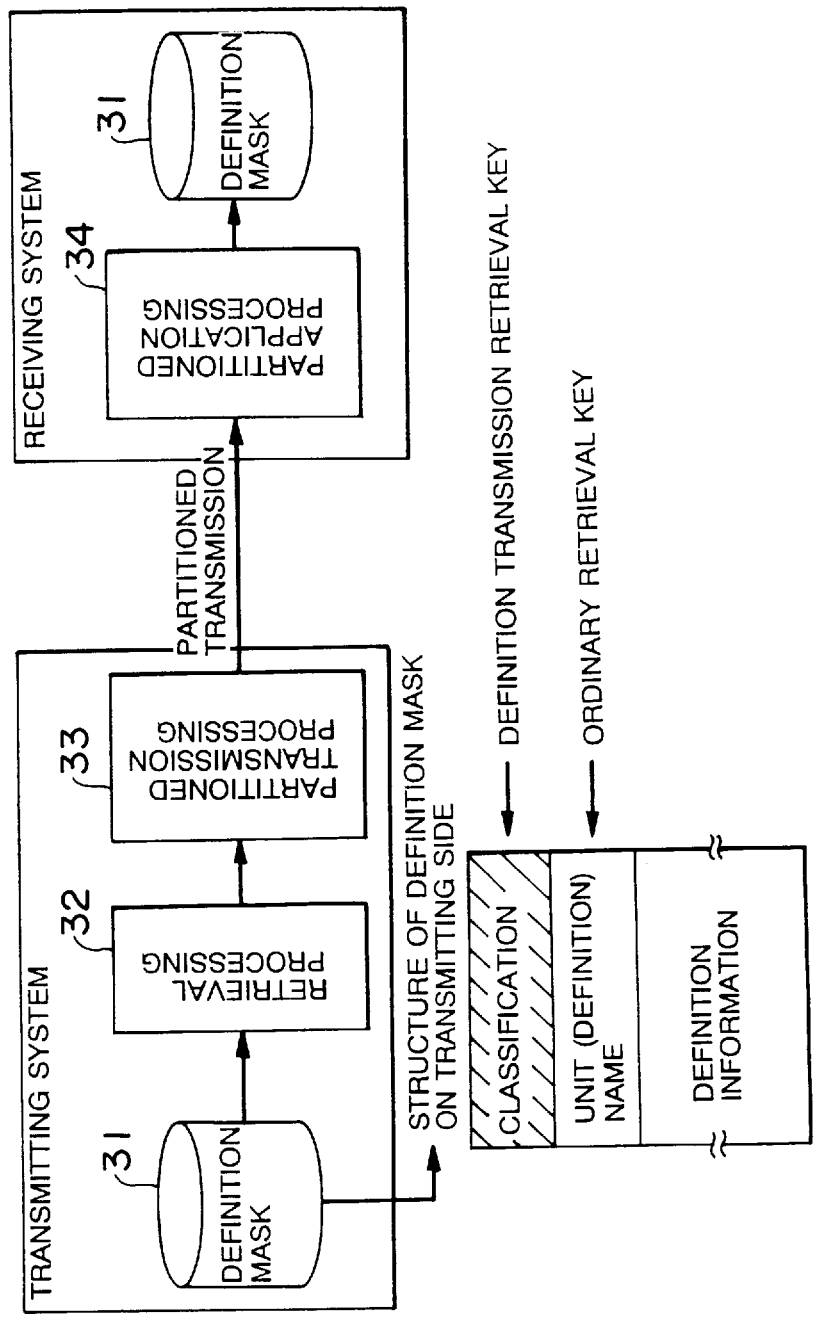

As shown in FIG. 16, a plurality of computer systems such as those of Embodiment 1 are provided on a network (NW), and, when definition information is distributed among the individual systems, the system that is transmitting the definition information file manages the definition information that is sent using the database 1, whereby the classification of the unit that is the target of the definition as seen by the transmitting system is managed by a definition master 31 along with the definition information as one of the definition information construction parameters; this classification value is partitioned by level according to a positional relationship, and the definition information is retrieved and read for each level using a retrieval processor 32. The information that has been read is partitioned and transmitted by a partitioned transmission processor 33, and then relayed to the definition master 31 by a partitioned application processor 34 at the receiving side.

The level partitioning of the classification values is done according to levels of hierarchy in a positional relationship as seen from the transmitting system.

For this reason, the structure of the definition master 31 on the database 1, as shown in FIG. 16, is one that connects and stores the classification of the unit that is the target of definition, the unit name (definition name), and the definition information.

Figure 17:
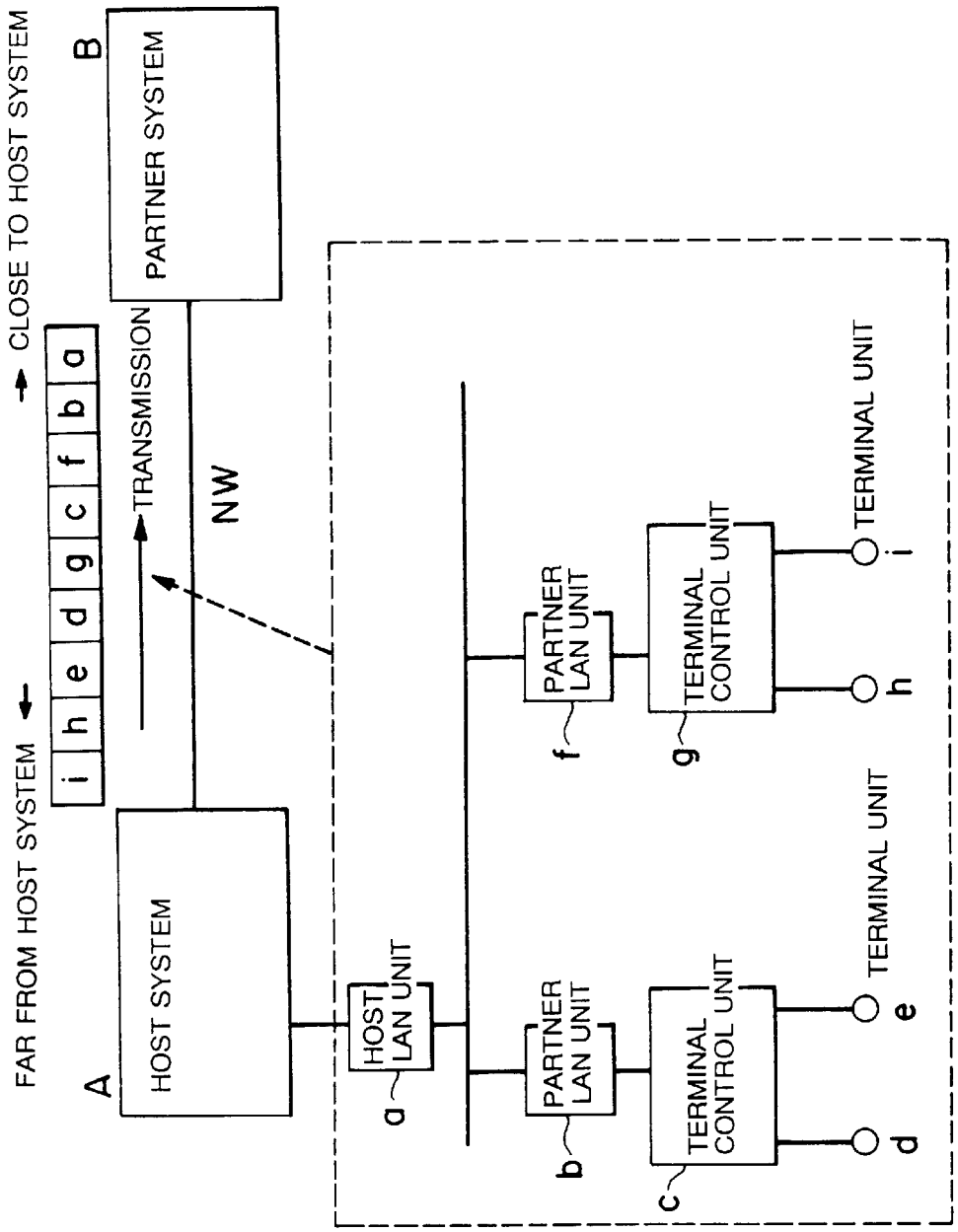

More specifically, as shown in FIG. 17, a host system A and its partner system B are connected via a network (NW). A LAN unit a is connected to system A, and a first partner LAN unit b and a second partner LAN unit f are connected to the first lower layer of the unit a. A terminal controller c is connected to the second lower layer below the first partner LAN unit b, and terminals d and e are connected to the third lower layer thereof. Similarly, a terminal controller g is connected to the second lower layer below the second partner LAN unit f, and terminals h and i are connected to the third lower layer below this.

Thus, a through i comprise definition information for indicating units, and when a positional relationship level (as seen from system A) is provided to these pieces of definition information, the LAN unit a of the first level closest to system A is level 1, the first partner LAN unit b and the second partner LAN unit f are level 2, the terminal controllers c and g are level 3, and the terminals d, e, h, and i are level 4.

Such information is stored in the definition master 31, but when it is transmitted, the definition information is read from the file in the definition master 31 and repeatedly transmitted from the units close to the system towards the units far from the system, and is thus sent to the receiving system in order from the definition information at the highest level in the hierarchy.

The definition information is consequently transmitted by being partitioned in order from level 1 to level 4, i.e., in order from close to the system, and more specifically, in the order a, b, f, c, g, d, e, h, i. When the levels are the same, however, the order may of course be changed.

In this case, the file access time is increased for retrieval, but since the retrieval time is offset by the transmission time due to the parallel processing of the retrieval and transmission, there is no overall effect on the transmission time.

At the receiving system, the definition information that is received is applied and relayed in this order. When the amount of definition information that is received at one time is less than the application amount, application is implemented when the application amount is reached, and when the amount of definition information received is larger than the application amount, it is partitioned internally for application.

For this reason, each system has a partitioned transmission processor 33 that partitions the definition information that is to be transmitted and transmits it, taking into account the volume received by the partner system, and also has a partitioned application processor 34 for partitioning the definition information received and applying it.

Figure 18:
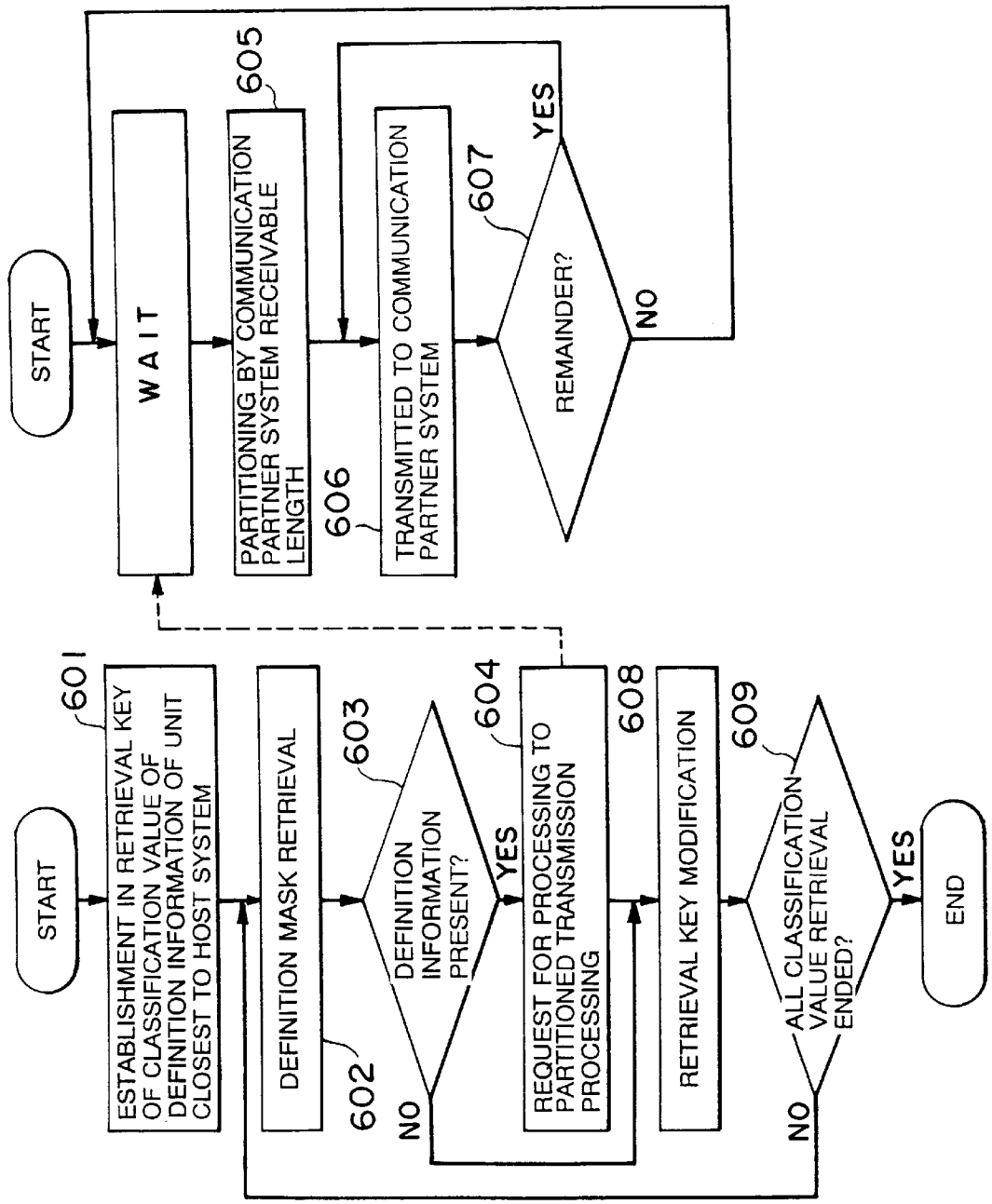

The effects of this Embodiment 2 are described below. FIG. 18 is a processing flow chart for the transmitting system. In transmission, the classification value of the definition information of the unit closest to the own system is set to the retrieval key (step 601). Retrieval is then performed from the definition information of the unit closest to the own system (step 602). A determination is then made as to whether definition information is present or not (step 603), and if information is present then it is transmitted to the partner system; processing is requested from the partitioned transmission processor 33 so that partitioned transmission processing is effected taking the processing capacity of the partner system into consideration (step 604). When the partitioned transmission processor 33 receives this request, it partitions the definition information that is to be transmitted into lengths that can be received by the partner system that is the target of the communication (step 605). Partitioning is not implemented if the partner system that is the target of the communication has a long enough receivable length. The partitioned information is then transmitted to the partner system (step 606), and this is continued until all of the remaining partitioned information has been transmitted (step 607).

When transmission has been ended, or when there is no definition information in step 603, the retrieval key is changed (step 608), and the transmission of the definition information is repeated until the retrieval of all the classification values has been completed, i.e., up to the definition information of the unit farthest from the host system (step 609).

As a result, the definition information is read and transmitted, as shown in FIG. 17. As a result, the collection of the definition information with the correct application order is constantly transmitted to the receiving system, however it has been partitioned.

Figure 19:
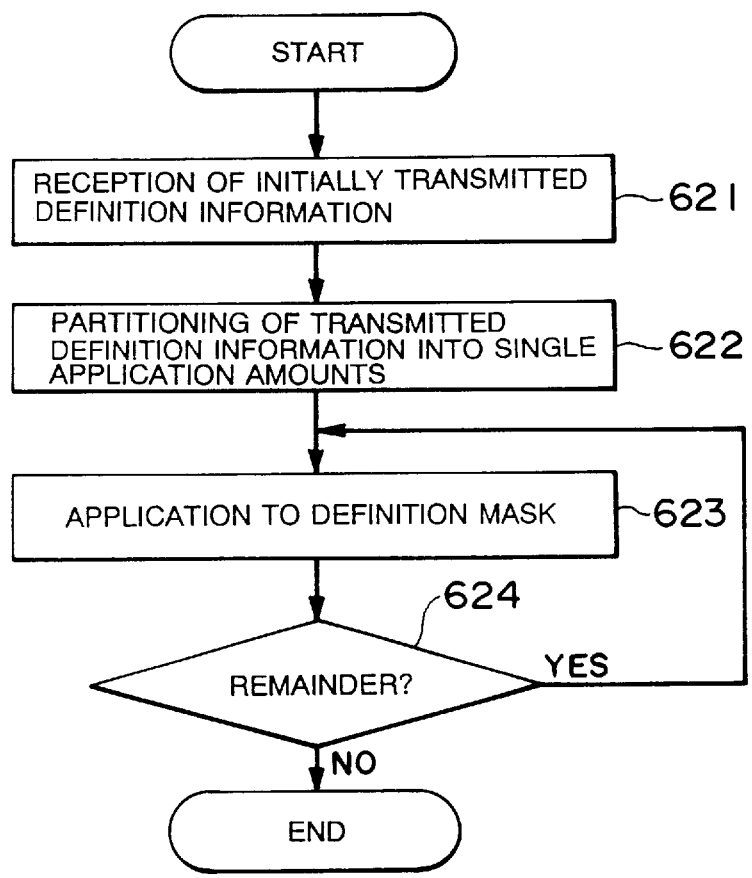

With the receiving partner system, meanwhile, as shown in FIG. 19, the definition information that was initially transmitted is received first (step 621). Then, the definition information that has been sent is partitioned into single application amounts (step 622). Specifically, in the relay of the definition information, the definition information is not relayed all at once, but the definition information is, rather, matched to the reception conditions and to the application amount of a single, active modification, and then applied. For this reason, each system has a definition information partitioned application processor 34, and the partitioned definition information is applied, i.e., relayed, to the definition master 31 (step 623), and this is repeated until the remaining definition information is gone (step 624).

The Merits of Embodiment 2

To realize the same functions as this embodiment with conventional technology, a sorting program and the storage device required for this, as well as a remote operation function for system restarting, among other things, would be required, which would result in an expensive system. With the present invention, however, since such functions are not required, the same results can be achieved at low cost, and there are moreover no restrictions, such as application capability only between specified systems, and application is possible to any system on the network (NW).

Specifically, the transmission of definition information in order from the definition information of the unit closest to the host system is not realized by reordering the definition information prior to transmission utilizing a conventional sorting technology, but is realized by utilizing definition information classification values that express the positional relationship of the definition information of each unit, preparing a file structure that allows the definition information to be retrieved using these classification values, and implementing retrieval from the definition information of the unit closest to the host system; it is consequently possible to realize a low-cost definition information transmission system that has no time loss.

In the application of definitions by the system that receives the definition information, partitioned application is effected utilizing the active modification function with which the host system is equipped, and this renders a special remote operation function and manual intervention, among other things, unnecessary for the system receiving the definition, and makes it possible to offer a low-cost definition information reception (application) system.

The active modification function with which a system is equipped is a function that applies the modified definition information to the system during operation.

Embodiment 3

Embodiment 3 is an embodiment that achieves the fourth object, and relates to a system that makes it possible to relay definition information to partner systems.

This embodiment is furnished with a component that makes it possible to relay definitions to partner systems by remote operation from a given or host system, and also provides the host system with a mechanism for combining the definition information modified data and relay prompt information into a single data unit.

The partner systems, moreover, are also provided with a mechanism for separating the data into modified data and relay prompt information. A mechanism is also provided for referencing the relay prompt information and relaying the modified data.

This embodiment also provides a component for implementing relay using definition information relay conditions that are different for each of a plurality of partner systems, and also provides a mechanism to the host system for evaluating the priority level of the definition information relay conditions of the host system and of the partner system.

As priority levels, "do nothing", "distribute only", and "relay after distribution", among others, are prompted to the distribution information of the host system to implement distribution. These can be set for each partner system.

The priority level of the definition information of a partner system has the same priority level as the own system, and it is possible to prompt whether or not to follow the relay prompt information of the host system. The mechanism for evaluating the priority level of the relay conditions makes it possible to realize the above by evaluating these priority levels.

The structure of Embodiment 3 is described in detail below.

Structure of the Host system

Figure 20:
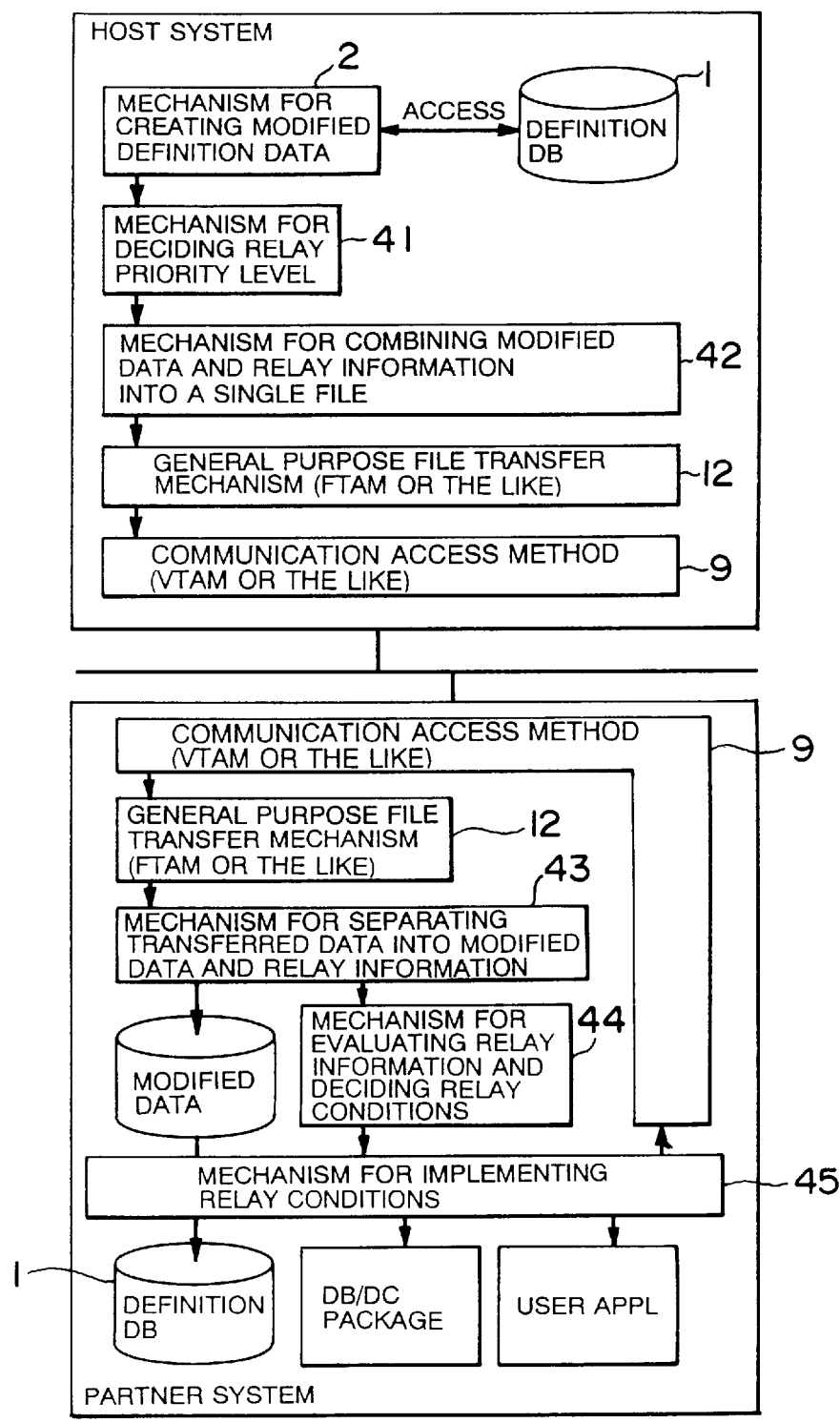

The host system is furnished with the following structure, as shown in FIG. 20.

(1) A modification processor 2 that receives the request for definition modification from the operator, accesses the definition information database 1, and creates the modified definition data.

(2) A relay priority level decision component 41 that decides the priority level for relaying the modified definition data to each partner system.

With this embodiment, when a priority level has been established for a definition modification request, it is used, and when it has not been established, the previously defined priority level is used. Embodiments that effect prioritization in reverse order are also acceptable, however.

(3) A file converter 42 (information coupler) that couples the relay priority level information decided in (2) with the modified definition data created in (1) and manages the resulting product as a single general purpose file.

Doing this makes it possible to transmit the part that is to be transmitted to the partner system by means of a general purpose file transmission mechanism.

(4) A duplicate transfer processor 12 utilizes FTAM (file transfer, access and management) or VTAM (virtual telecommunications access method) or the like to transfer the file to the partner system. Here, the protocol is not specifically established.

(5) A communicator 9 (transmission).

The Structure of the Partner System (1) A communicator 9 (reception).

(2) A file decoder 43 (information separator) that separates the file received into the modified definition data and the relay priority level information.

(3) A relay condition decision component 44 that determines whether or not to prompt the relay priority level the host system, and that relays the relay conditions. In this embodiment, relay is accomplished in the manner of the relay priority level combination examples of Table 1.

TABLE 1

| PARTNER SYSTEM PRIORITY LEVEL HOST SYSTEM | | | | |
|---|---|---|---|---|
| | | NOT ACCORDING TO HOST SYSTEM | | |
| PRIORITY LEVEL (NOTE) | ACCORDING TO HOST SYSTEM | NOTHING | ONLY DISTRIBUTION | RELAY AFTER DISTRIBUTION |
| NOTHING | NOTHING | NOTHING | ONLY DEFINITION MODIFICATION | DEFINITION RELAY EXECUTION |
| ONLY DISTRIBUTION | ONLY DEFINITION MODIFICATION | NOTHING | ONLY DEFINITION MODIFICATION | DEFINITION RELAY EXECUTION |

TABLE 1-continued

| PARTNER SYSTEM PRIORITY LEVEL HOST SYSTEM | | NOT ACCORDING TO HOST SYSTEM | | |
|---|---|---|---|---|
| PRIORITY LEVEL (NOTE) | ACCORDING TO HOST SYSTEM | NOTHING | ONLY DISTRIBUTION | RELAY AFTER DISTRIBUTION |
| RELAY AFTER DISTRIBUTION | DEFINITION RELAY EXECUTION | NOTHING | ONLY DEFINITION MODIFICATION | DEFINITION RELAY EXECUTION |

(NOTE)
WHEN THE HOST SYSTEM PRIORITY LEVEL HAS NOT BEEN ESTABLISHED AT THE TIME OF DEFINITION MODIFICATION REQUEST, THE DEFINITION PREVIOUSLY DEFINED BY THE SYSTEM IS USED. WHEN IT HAS BEEN ESTABLISHED AT THE TIME OF THE DEFINITION MODIFICATION REQUEST, THIS IS GIVEN PRIORITY.

When the relay priority level of a given system is to be designated, this is made possible by giving a definition of "according to the prompt of the own system" with the definition of the partner system. A partner system definition of "not according to the prompt of the own system" allows a suitable relay priority level to be decided for each partner system.

(4) A relay execution component 45 for relaying definition information according to the conditions decided by the relay condition decision component 44.

The effects of Embodiment 3 are described below.

Figure 21:
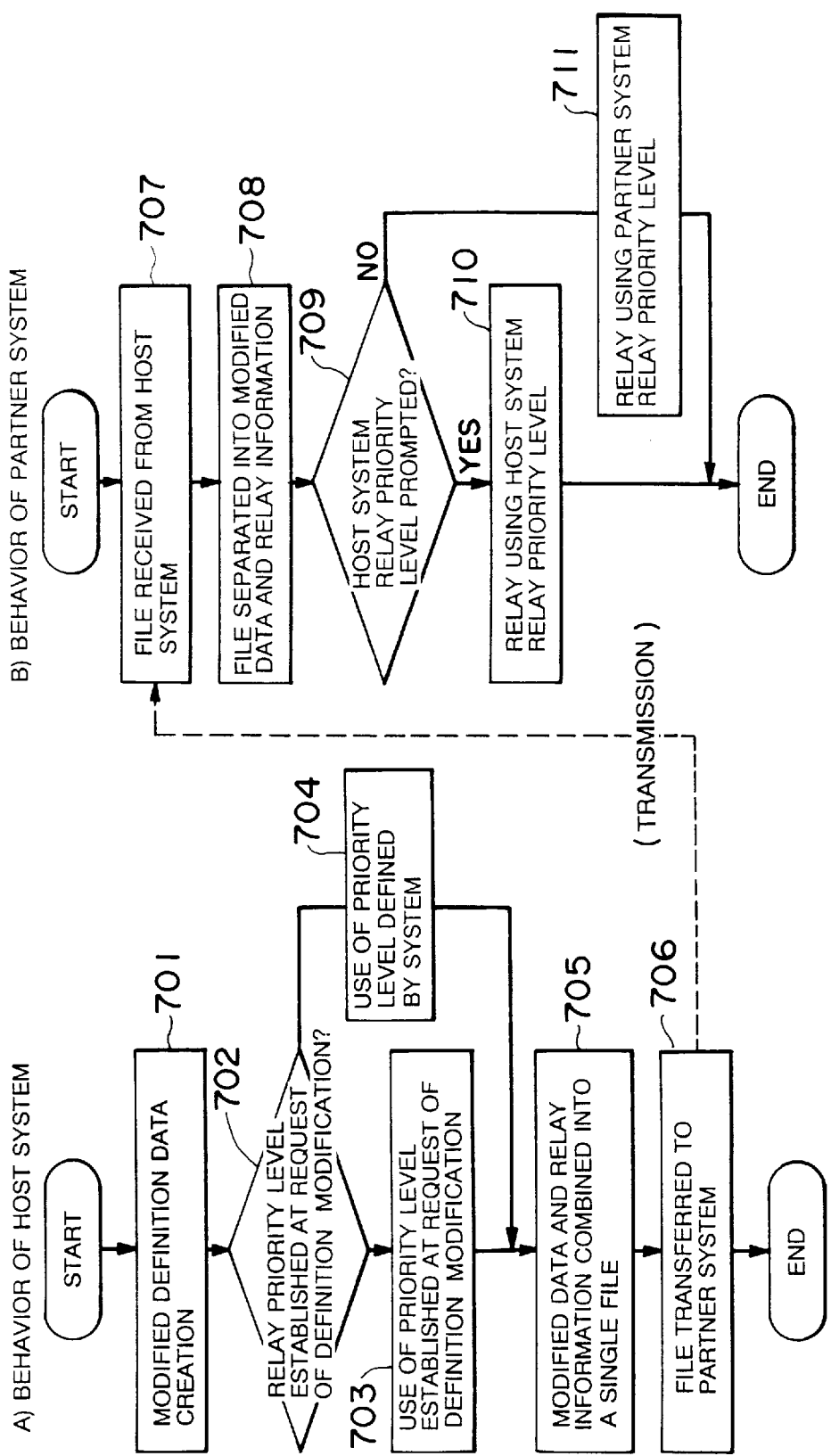

As in the processing flow shown in FIG. 21, at the host system, a request for definition modification is first received from the operator, and the definition information database 1 is accessed, after which modified definition data is created (step 701). A determination is then made as to whether a relay priority level has been established for the definition modification request (step 702), and if a relay priority level has been established then the priority level established for the definition modification request is used (step 703), and if a relay priority level has not been established for the definition modification request, then the priority level defined by the system is used (step 704).

The modified definition data and the relay priority level information are then coupled to create a single general purpose file (step 705). This file is then transmitted to the partner system (step 706).

At the partner system, meanwhile, said file is received (step 707). The file received is then separated into the modified definition data and the relay priority level information (step 708).

A determination is then made as to whether to not to prompt the relay priority level of the host system (step 709); when it is prompted, relay is executed according to the relay priority level of the host system (step 710), and when the relay priority level of the host system is not prompted, relay is executed according to the relay priority level of the partner system (step 711).

The Merits of Embodiment 3

With this embodiment, the mechanism is simple, and it is particularly easy to match the existing host system environment. Since it is possible to relay the definition of the partner system by remote operation, partner system operator intervention is unnecessary.

It is possible to execute simultaneous distribution using differing definition information relay conditions for a plurality of partner systems, and operation in the ideal network configuration for each office is therefore possible.

Embodiment 4

Embodiment 4 of the present invention, which achieves the fifth object described above, is described with reference to FIGS. 22 to 27.

This embodiment makes is possible, in a system that shares network definition information among a plurality of systems at the same time, or in a system that simultaneously processes the definition information of a host system and its partner systems, to overlap the verification and recording of the definition information of a plurality of systems and thus eliminate wasteful processing wait time, and to ensure conformability over the entire network (NW) and record the definition information when definition information incorporated from a plurality of systems is recorded separately.

When the definition information of a plurality of systems is recorded collectively, if there is an error in the definition information of a given system, it is nevertheless possible to ensure the conformability of, and to record, the definition information incorporated from the other, error-free, systems.

It is thus possible to ensure the conformability over the entire network (NW) and to record the definition information by overlapping the verification and recording of the definition information of the host system and the partner systems.

Here, in order to partition the verification and the recording of the definition information and mitigate the influence of the partitioning, a management list is included to manage, for example, the names of the resources on the network (NW). This management list, as shown in FIG. 26, manages, for example, the names of the definition information, the condition of recording of this definition information, the name of the system at which the definition information originated, the mutual relationship, and the error information. This management list is created from the definition information and from the operational classifications thereof when definition is executed at the host system and when the definition information is received from partner system. This definition information management list is the same as the management list in Embodiment 1.

The management list is thus used prior to the recording of the definition information, and a name uniformity check and a verification of the conformability with the other definitions are executed in definition processing units. For definition information discovered to have an error in this verification, information to that effect is appended and included.

Under normal circumstances, the configuration in the management list is designated a temporary recording configuration (in the case of expansion: temporary expansion; in the case of modification: temporary modification; in the case of deletion: temporary deletion), and the definition information is recorded. (Aside from name uniformity and the mutual relationship of the definitions, the definition information incorporated from the partner systems is information that has been assured.)

The configuration in the management list of definition information that has been recorded is then made into a definite record configuration (in the case of expansion or modification: definite record; in the case of deletion: deleted from the management list).

For definition information having an error, notification thereof is given to the manager of the system that gave an error definition from the management list.

Embodiment 4 is described in detail below. The structure of this Embodiment 4 is described first.

Figure 22:
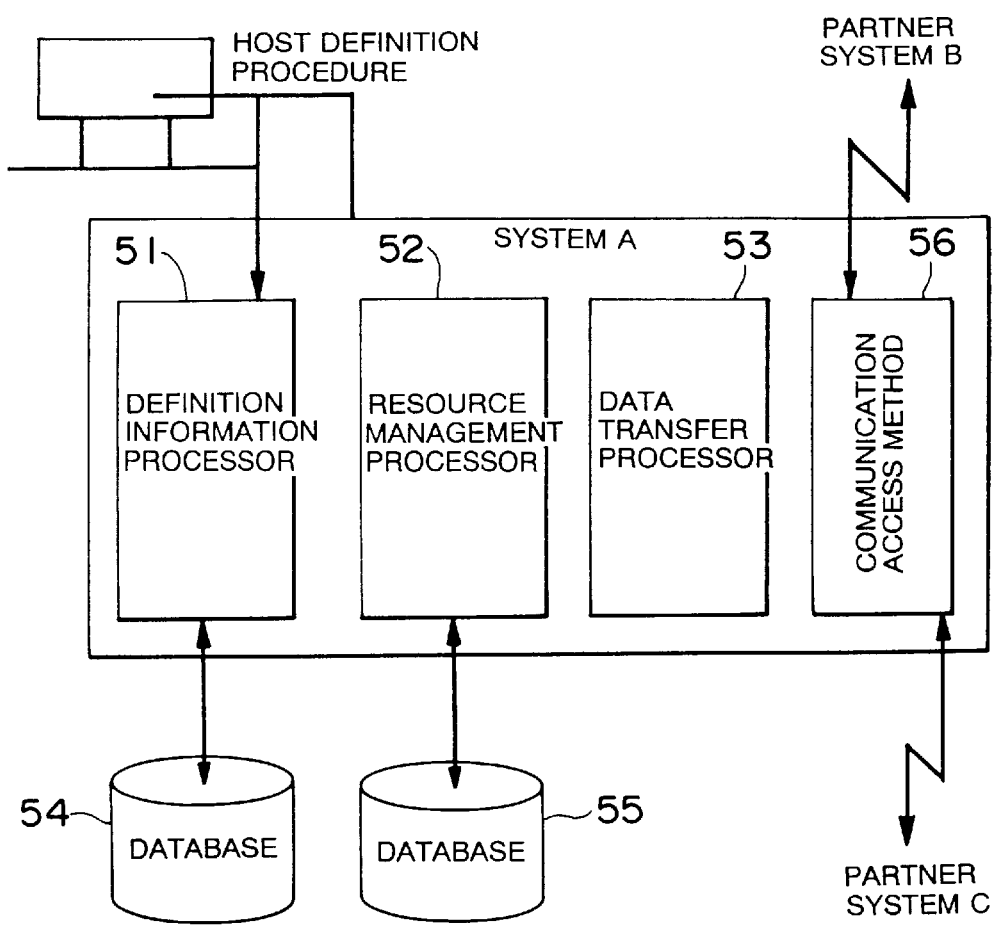

The information processing unit shown in FIG. 22 is either a system that simultaneously communicates network (NW) definition information among a plurality of systems, or is a system that simultaneously processes the definition information of a host system and partner systems.

This system is furnished with a definition information processor 51 that records the modified definition information when a definition information modification procedure has been executed, a resource information management processor 52 that manages resource information that contains definition information, a data transfer processor 53 that receives the definition information from the partner systems, databases 54 and 55 that store the management list and the definition information, and a communicator 56 that effects communication over the network (NW).

The resource information management processor 52 (not shown in the figure) has a verification processor that verifies the definition information that has been transferred from the partner system, and a recording processor that records the definition information that has been found to be error-free as a result of verification. When the verification and recording of a plurality of received definition information is sequentially executed, the verification of the latter definition information is executed at the same time as the recording of the previous definition information.

The resource information management processor 52 receives the definition information and operation classification, executes a uniformity check on the definition information names, as well as a mutual relationship check, and as a result writes to the management list the name of the definition information recorded from the definition information operation classification, the recorded configuration of the definition information, and the names of other, related definition information, and records this in the databases 54 and 55.

The effects of this Embodiment 4 are described below.

Figure 23:
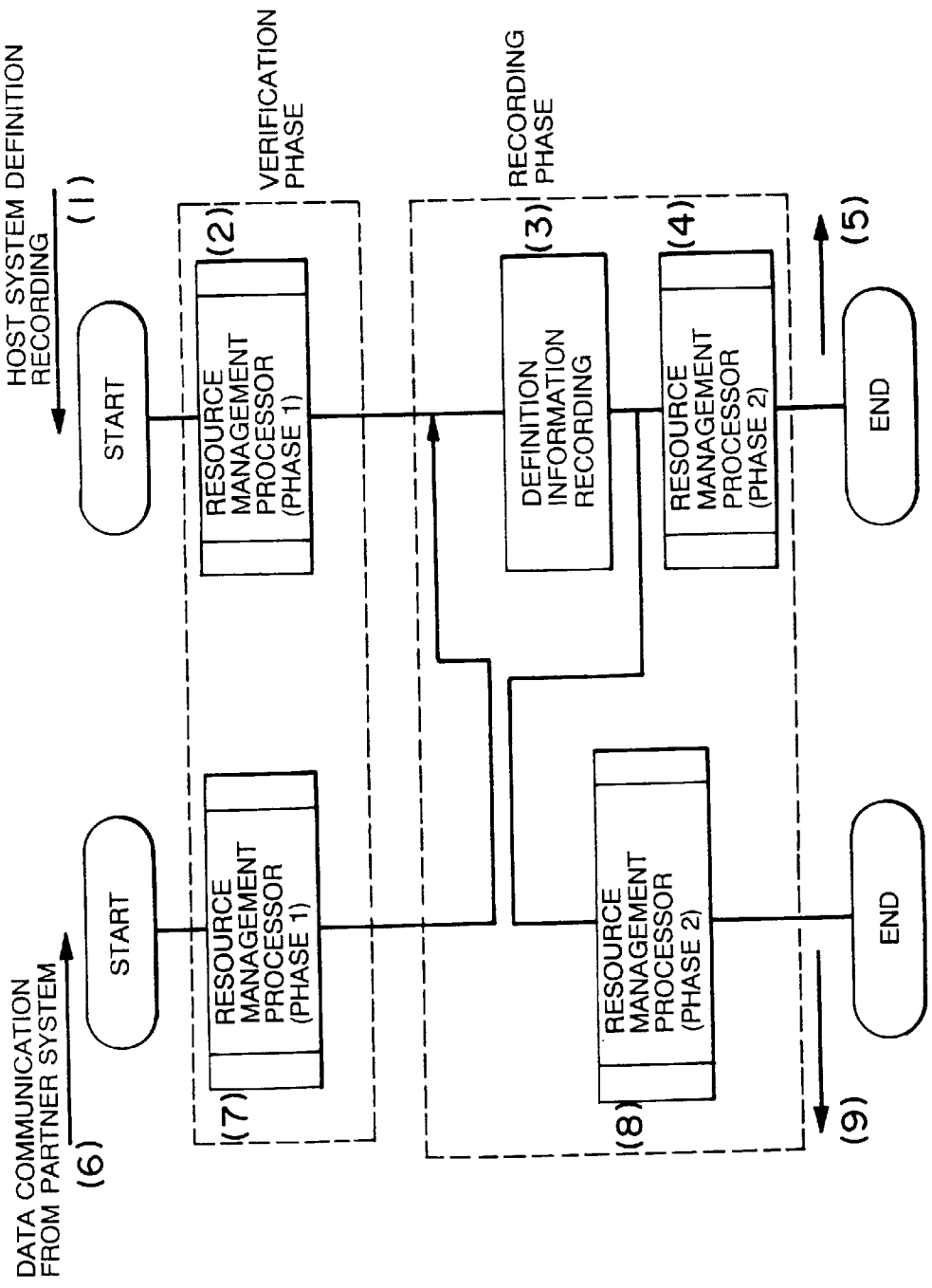

Processing in the case of the relay of definition information for the host system is described using FIG. 23.

(1) The recording of definitions for executing communication with the terminal of the host system, the applications program, and partner systems is requested from the system manager.

Figure 24:
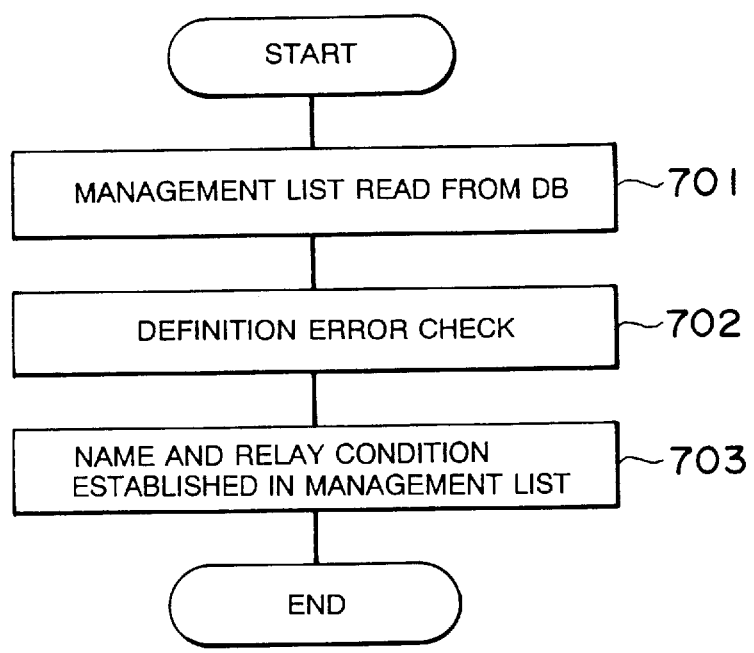

(2) The resource information management processor (phase 1: verification phase) is called. As a result, a management list is created, or updated. Specifically, as shown in FIG. 24, the management list is first read from the databases 54 and 55 (step 701). A definition error check, e.g., name and mutual relationship checks, is then executed (step 702). The name and relay configuration are then established in the management list (step 703).

(3) As a result of (2), only the normal definition information is objectified, the object created is stored in the DB, and the other subsystem is notified of the modification of the definition information.

Figure 25:
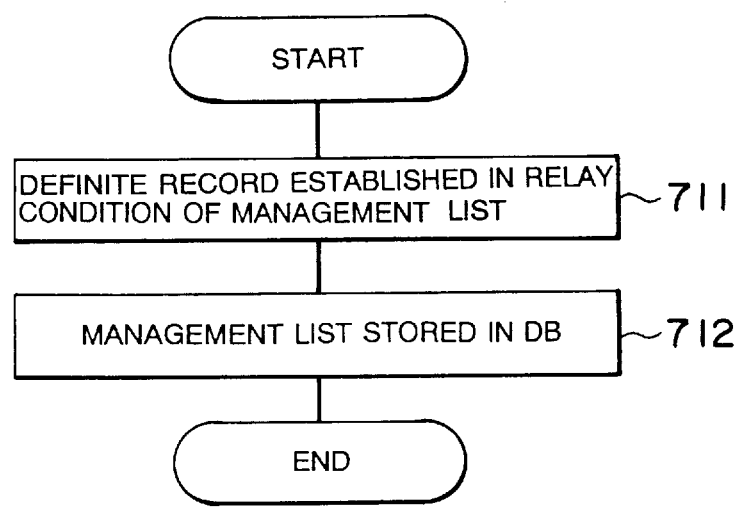

(4) The resource information management processor (phase 2: recording phase) is called. Here, the management list is recorded as definite information. Specifically, as shown in FIG. 25, definite information is established in the relay configuration of the management list in order to record the error-free information for which verification has been completed (step 711). The management list is subsequently stored in the databases 54 and 55 (step 712).

(5) Finally, the results are returned.

Processing when the definition information is received from partner system is described below.

(6) The definition information is received from partner system.

(7) The resource information management processor (phase 1) is called. As a result, a management list is created or updated. The processing that is executed here is the same as that in (2) above.

(8) As a result of (7), only the error-free definition information is objectified, and the object created is stored in the DB, and the other subsystem is notified of the definition information modification.

(9) The resource information management processor (phase 2) is called. As a result, the management list is recorded as definite information. The processing that is executed here is the same as that of (4) above.

(10) The results are returned. An example of a management list is depicted in FIG. 26.

In the above processing, as shown in FIG. 27, the system A verification phase and recording phase that accompany the modification of the definition information for systems B and C are executed simultaneously in the period depicted by t2 to t3.

The Merits of Embodiment 4

This embodiment has the following merits when communication is effected and definition information recorded among a plurality of systems simultaneously.

(1) When the units of definition information of individual systems are processed separately, it is possible to ensure conformability, and execute recording, over the entire network (NW), without holding the recording of the definition information of a given system. The processing time is consequently shortened, and this allows the time taken by the resource, e.g., memory, to be shortened, and the communication errors caused by monitoring the communication time to be reduced, and makes it possible to minimize the effect on the processing.

(2) When the definition information of a plurality of systems is recorded collectively, it is possible to reduce the amount of data communicated, for example, due to the fact that even when there is an error in the definition information of a given system, it is acceptable to simply incorporate and record the definition information for this system a second time.

In the recording of the definitions of a given system and the definitions of partner system, it is possible to execute the recording of the definition information in the same manner as in (1).

It is thus possible to overlap the verification and recording of the definition information and thus eliminate wasteful processing wait time, and it is thus also possible, when there is an error, to immediately give notice of said error. This makes it possible to ensure the conformability of the definition information over the entire network (NW).

When the definition information of a plurality of systems is processed collectively and an error is found, moreover, an error is noted only for the definition information of the system in which it occurred, and this system is notified of this error; this makes it possible to ensure the conformability of the definition information over the entire network (NW).

What is claimed is:

1. A distribution information management system of a first information processing unit of first and second information processing units connected to a network, said distribution information management system comprising:
   a database for storing information, a duplicate of the information being distributed to the second information processing unit;
   modification processing means for modifying the information in the database;
   modification content management means for storing the contents of the information modification at the time of the information modification;
   differential extraction means for extracting a differential between the information before modification and the information after modification, said differential extraction means referencing the modification content management means during the extraction of the differential and extracting as the differential a part of the information that has been modified; and
   duplicate transfer processing means for transmitting the differential extracted by the differential extraction means to the second information processing unit, wherein
      a plurality of information units are connected to the network,
      the information in the database is distributed from the first information processing unit to each of the other information processing units connected to the network and the information that is distributed is definition information necessary for communication over the network, and
      the information is distributed from the first information processing unit to the other information processing units based on a hierarchical positional relationship of said other information processing units and in accordance with the proximity along the network of each of said other information processing units to the first information processing unit.

2. A distribution information management system as defined in claim 1, further comprising:
   identification symbol provision means for providing information identification symbols indicating the age of the differential transmitted to the second information processing unit, wherein
      the differential extraction means includes a destination information management means for managing the information identification symbols and,
      when information has been modified, said differential extraction means compares new information identification symbols indicating the modified information with old information identification symbols indicating the duplicate information of the second information processing unit managed by the destination information management means, and extracts a differential between the information corresponding to the old information identification symbols and the information corresponding to the new information identification symbols, said differential extraction means extracting as the differential a part that has been changed by referencing the modification content management means.

3. A distribution information management system as defined in claim 1, further comprising:
   identification symbol provision means for providing information identification symbols indicating the age of the differential transmitted to the second information processing unit, wherein
      the differential extraction means includes a destination information management means for managing the information identification symbols and,
      after information has been modified, said differential extraction means compares new information identification symbols indicating the modified information with old information identification symbols indicating the duplicate information of the second information processing unit managed by the destination information management means, and extracts a differential between the information corresponding to the old information identification symbols and the information corresponding to the new information identification symbols.

4. A distribution information management system as defined in claim 3, wherein the differential extraction means includes
   a resource information entry having a location of the information in the database, the information identification symbols, and a name of the information; and
   a distribution resource list provided for each of the information identification symbols, the distribution resource list having under its control one or a plurality of resource information entries, when a resource information entry having a symbol newer than the information identification symbol is present, said distribution resource list is prepared for the latest modified information identification symbols in these resource information entries; and
   the differential extraction means retrieves the resource information entry under the control of the distribution resource list corresponding to the information identification symbol of the differential information to be transmitted, and extracts the modified information managed by the resource information entry.

5. A distribution information management system as defined in claim 4, wherein the differential extraction means has a resource information set that controls the one or a plurality of resource information entries so that the transmitted edition number of the distribution resource list is not exceeded, and wherein the retrieval of the modified information is executed for the resource information entries from the distribution resource list via the resource information set.

6. A distribution information management system as defined in claim 4, wherein the distribution resource list of the differential extraction means is placed in a queue in edition number order.

7. A distribution information management system as defined in claim 4, further comprising a differential extraction environment expansion processing means, when information has been modified, for creating an age identification symbol for the new information and for incorporating the age identification symbol as a resource information entry in a resource information set.

8. A distribution information management system as defined in claim 1, further comprising a differential extraction environment construction means for constructing the differential extraction means for performing differential extraction.

9. A distribution information management system as defined in claim 1, wherein a plurality of information processing units are connected to the network and the distribution information management system further comprising:
   a differential extraction environment updating processing means for removing from the differential extraction means the extraction environment of the differential of the modified information corresponding to the information identification symbol that is made superfluous as a result of the transmission of differential information from the first information processing unit to other information processing units on the network.

10. A distribution information management system as defined in claim 9, wherein said differential extraction environment updating processing means deletes from the differential extraction means the distribution resource list for the modified information corresponding to the information identification symbol that is made superfluous as a result of the transmission of differential information from the first information processing unit to other information processing units of the network.

11. A distribution information management system as defined in claim 1, further comprising an operations control means for prompting a replacement of the differential between old and new information for at least one of the information processing units, other than the first information processing unit, at the time of a start-up of the first information processing unit.

12. A distribution information management system as defined in claim 11, wherein the operations control means prompts the replacement of the differential between the old and new information for the second information processing unit upon receiving a request from the second information processing unit.

13. A distribution information management system as defined in claim 1, further comprising a duplicate relay processing means for relaying the differential information received from the second information processing unit to the database.

14. A distribution information management system as defined in claim 1, further comprising:
   a definition master for connecting and storing a classification of a respective information processing unit that is a target of definition, a unit name, and the definition information in said database,
   wherein said distribution information management system divides said classification by a hierarchical level related to the hierarchical positional relationship and the proximity along the network of the respective information processing unit to the first information processing unit,
   retrieves definition information for each hierarchical level from the definition master and
   transmits the retrieved definition information from the first information processing unit to the second information processing unit.

15. A distribution information management system as defined in claim 1, wherein the first information processing unit includes a partitioned transmission processor that partitions the definition information that is to be transmitted, taking into account a receiving volume of the second information processing unit, and then transmits the definition information.

16. A distribution information management system as defined in claim 1, wherein the first information processing unit includes a partitioned application processor for partitioning the definition information that has been received and then applying the definition information.

17. A distribution information management system as defined in claim 1, wherein the information that is to be distributed is the definition information required for communication over the network, the distribution information management system further comprising:

information coupling means, in the relay of the definition information through its distribution to the partner information processing units that are the target of communication, for coupling the modified definition information created by the modification processing means and the relay prompt information that prompts the relay of the definition information; and duplicate transfer processing means for transmitting the coupled modified definition information and the relay priority level information to the partner information processing unit.

18. A distribution information management system as defined in claim 17, further comprising relay priority level decision means for deciding a priority level for the relay of the modified definition information to each of the partner information processing units, and if the priority level is included in said relay prompt information, said information coupling means couples and transmits the relay prompt information and the modified definition information.

19. A distribution information management system as defined in claim 17, further comprising:
   information separation means for separating the coupled information received into modified definition information and relay prompt information; and
   relay execution means for relaying the modified definition information according to the relay prompt information.

20. A distribution information management system as defined in claim 19, further comprising:
   relay condition decision means, when the relay priority level is different for a partner information processing unit, for evaluating and deciding the relay priority level of the definition information at the partner information processing unit and the host information processing unit, and deciding the relay conditions by selecting either the relay priority level of the host information processing unit or the relay priority level of the partner information processing unit.

21. A distribution information management system in which a plurality of information processing units are connected to a network, the plurality of information processing units including a first information processing unit and a plurality of partner information processing units of the first information processing unit, the distribution information management system comprising:
   means for distributing definition information required for communication among the information processing units to the information processing units connected to the network;
   means for relaying the definition information to the information processing units; and
   means for transmitting definition information from the first information processing unit to the partner information processing units based on a hierarchical positional relationship of the partner information processing units and in accordance with the proximity along the network of each partner information processing unit to the first information processing unit.

22. A distribution information management system as defined in claim 21, further comprising:
   a definition master for connecting and storing a classification of a respective information processing unit that is a target of definition, a unit name, and the definition information,
   wherein said distribution information management system
      divides said classification by a hierarchial level related to the hierarchical positional relationship and the proximity along the network of the respective information processing unit to the first information processing unit, retrieves the definition information for each level from the definition master, and transmits the retrieved definition information from the first information processing unit to the other information processing units.

23. A distribution information management system as defined in claim 21, wherein the first information processing unit includes a partitioned transmission processor that partitions the definition information that is to be transmitted, taking into account the volume received by the second information processing unit, and then transmits the definition information.

24. A distribution information management system as defined in claim 21, wherein the information processing unit includes a partitioned application processor for partitioning the definition information received and then applying the definition information.

25. A distribution information management system in which a plurality of information processing units are connected to a network, comprising:

means for distributing and relaying definition information required for communication among information processing units that include a first information processing unit and communication partners;

modification processing means for modifying the definition information;

information coupling means for coupling relay prompt information that prompts relay of the modified information and the modified definition information created by the modification processing means; and duplicate transfer processing means for transmitting the coupled modified definition information and relay prompt information to the information processing units that are communication partners, based on a hierarchical positional relationship of said information processing units that are communication partners, and in accordance with a proximity, along the network, of each of said information processing units that are communication partners to the first information processing unit.

26. A distribution information management system as defined in claim 25, wherein each of the information processing units that are communication partners includes relay priority level decision means for deciding a priority level for the relay of the modified definition information, and wherein the priority level decided by the relay priority level decision means is included in said relay prompt information, and the relay prompt information is coupled with the modified definition information by said information coupling means and then transmitted.

27. A distribution information management system as defined in claim 26, further comprising:

relay condition decision means, when the relay priority level is different for a host information processing unit than a communication partner information processing unit of the host information processing unit, for evaluating and deciding the relay priority level of the definition information at the communication partner information processing unit and the host information processing unit, and deciding the relay conditions by selecting either the relay priority level of the host information processing unit or the relay priority level of the communication partner information processing unit.

28. A distribution information management system as defined in claim 25, further comprising:

information separation means for separating the coupled information received into modified definition information and relay prompt information; and relay execution means for relaying the modified definition information according to the relay prompt information.

29. A distribution information management system of a first information processing unit of first and second information processing units connected to a network, said distribution information management system comprising:

a database for storing information, a duplicate of the information being distributed to the second information processing unit;

modification processing means for modifying the information in the database;

modification content management means for storing the contents of the information modification at the time of the information modification;

differential extraction means for extracting a differential between the information before modification and the information after modification said differential extraction means referencing the modification content management means during the extraction of the differential and extracting as the differential a part of the information that has been modified;

duplicate transfer processing means for transmitting the differential extracted by the differential extraction means to the second information processing unit;

a verification processor for verifying information transferred from the second information processing unit;

a recording processor for recording information found to be error-free as a result of the verification; and a management list including a name of the definition information, a state of recording of the definition information, and a name of other definition information related to the definition information, wherein, in a sequential verification and recording of a plurality of received information, said verification processor verifying subsequent information at the same time as previous information is recorded, and the information is definition information required for communication among the first and second information processing units, and said verification processor receives the definition information and an operation classification, and executes a uniformity check on the definition information names, and a mutual relationship check of the definition information to the other definition information, and wherein said recording processor writes the name of the definition information recorded from results of the uniformity check and the mutual relationship check, the operation classification, the recorded configuration of the definition information, and the names of the other, related definition information to the management list, and records the management list in a database.

30. A distribution information management system as defined in claim 29, wherein when there is an error, notice of the error is immediately given.

31. A distribution information management system as defined in claim 29, wherein when the definition information of a plurality of systems is processed collectively and an error is found, an error is noted only for the definition information of a system in which the error occurred, and the system is notified of the error.

32. A communication system comprising:

a network; and a plurality of information processing units connected to the network, each information processing unit including a database for storing information, a duplicate of the information being distributed to each of the other information processing units, wherein each respective information processing unit modifies the information in its database, extracts a differential of the information before modification and the information after modification, and transfers the differential to each of the other information processing units in accordance with a hierarchical positional relationship of said other information processing units and a proximity, along the network, of each of said other information processing units to the respective information processing unit wherein the differential is definition information.

* * * * *